(12) United States Patent
O'Brien

(10) Patent No.: US 10,726,609 B2
(45) Date of Patent: Jul. 28, 2020

(54) PERSPECTIVE DISTORTION IN MULTI-DISPLAY SYSTEM

(71) Applicant: Pure Depth, Inc., Redwood City, CA (US)

(72) Inventor: Austin F. O'Brien, Auckland (NZ)

(73) Assignee: Pure Depth Limited (NZ)

( * ) Notice: Subject to any disclaimer, the term of this patent is extended or adjusted under 35 U.S.C. 154(b) by 0 days.

(21) Appl. No.: 16/197,398

(22) Filed: Nov. 21, 2018

(65) Prior Publication Data

US 2019/0156553 A1 May 23, 2019

Related U.S. Application Data

(60) Provisional application No. 62/589,591, filed on Nov. 22, 2017.

(51) Int. Cl.
| | |
|---|---|
| *G06T 15/20* | (2011.01) |
| *G06T 3/40* | (2006.01) |
| *G06T 19/20* | (2011.01) |
| *G09G 3/00* | (2006.01) |
| *H04N 13/395* | (2018.01) |
| *H04N 13/122* | (2018.01) |
| *H04N 13/275* | (2018.01) |

(52) U.S. Cl.
CPC ............... *G06T 15/20* (2013.01); *G06T 3/40* (2013.01); *G06T 19/20* (2013.01); *G09G 3/00* (2013.01); *H04N 13/122* (2018.05); *H04N 13/395* (2018.05); *H04N 13/275* (2018.05)

(58) Field of Classification Search
CPC . G06T 15/20; G06T 11/80; G06T 3/40; G06T 19/20; G06F 16/50; G06F 2203/04806; G09G 3/003; G09G 3/00; H04N 13/395; H04N 13/122; H04N 13/275
See application file for complete search history.

(56) References Cited

U.S. PATENT DOCUMENTS

| | | | |
|---|---|---|---|
| 2003/0001834 A1* | 1/2003 | Chaw | G06T 13/40 345/418 |
| 2011/0249026 A1* | 10/2011 | Singh | G09G 3/003 345/630 |
| 2013/0217486 A1* | 8/2013 | Schlottmann | H04N 13/0475 463/31 |

(Continued)

FOREIGN PATENT DOCUMENTS

EP    1 221 674 A2    7/2002

*Primary Examiner* — Haixia Du
(74) *Attorney, Agent, or Firm* — Craig A. Baldwin

(57) ABSTRACT

A multi-layer display may include a first screen and a second screen arranged in a substantially parallel manner, with the first screen and the second screen including an array of pixels and the second screen overlapping the first screen, a light configured to provide light to the first screen and the second screen of the multi-layer display system, and a processing system comprising at least one processor and memory. The processing system may be configured to apply perspective distortion to automatically bake the desired aspects of perspective into a physically thin object. To achieve this, the object's vertices are moved along lines drawn through a fixed point in space (a primary viewpoint). From this viewpoint, regardless of any perspective distortion applied, the object will appear to not change.

8 Claims, 21 Drawing Sheets

(56) References Cited

U.S. PATENT DOCUMENTS

2014/0192053 A1 7/2014 Bi et al.
2017/0148250 A1* 5/2017 Angermayer .......... G06T 17/20
2017/0330463 A1 11/2017 Li et al.

* cited by examiner

PERSPECTIVE DISTORTION IN MULTI-DISPLAY SYSTEM

CROSS REFERENCE TO RELATED APPLICATION

This patent application claims priority to and the benefit of U.S. Provisional Application No. 62/589,591, filed on Nov. 22, 2017, which is hereby incorporated herein by reference in its entirety.

RELATED APPLICATIONS

Three dimensional content to which perspective distortion is applied according to exemplary embodiments described herein may be used in multi-display system (MLD), including but not limited to in any of the multi-display systems described in any of U.S. patent application Ser. Nos. 14/986,158; 14/855,822; 14/632,999; 15/338,777; 15/283,525; 15/283,621; 15/281,381; 15/409,711; 15/393,297; 15/378,466; 15/359,732; 15/391,903, all of which are hereby incorporated herein by reference in their entireties.

FIELD OF THE INVENTION

The invention relates generally to multi-layer displays and displaying three-dimensional content on multi-layer displays and, more particularly, to multi-layer displays and methods for applying perspective distortion to three-dimensional content for display on multi-layer displays and/or other three dimensional displays.

BACKGROUND

When presenting content to 3D displays, whether stereoscopic, autostereoscopic, multi-layer display (MLD) system, or any other such technology, often there is a need to render 3D content. However, rendering infinitely deep scenes is not practical for most use cases, as this often forces the display to act as a 'window' into another scene. For example, if the display acts as a 'window' onto a virtual scene, the composition of the final image can vary greatly as the display is viewed from different angles (see e.g., FIG. 2A).

This is often resolved by opting to render static content instead of a fully 3D scene, or ensuring that the scene is physically thin so the parallax is low enough to not severely impact the consistency and comprehension of the scene. The former creates unnaturally fixed content that is viewpoint-independent but perspective accurate, while the latter suffers from significantly reduced perspective cues (i.e. perspective lines, size, etc.) despite being dynamic.

SUMMARY

Exemplary embodiments of this disclosure provide for performing perspective distortion to three-dimensional content to address one or more issues in conventional systems and approaches. By performing perspective distortion, embodiments of this disclosure can automatically bake the desired aspects of perspective into a physically thin object. To achieve this, the object's vertices are moved along lines drawn through a fixed point in space (a primary viewpoint). From this viewpoint, regardless of any perspective distortion applied, the object will appear to not change.

Exemplary embodiments of this disclosure include displaying content to which perspective distortion has been applied for display on a multi-layer display (MLD) system that can display content on different display screens provided in a stacked arrangement. Exemplary embodiments include receiving content to display on the MLD system, applying perspective distortion to the content, and simultaneously displaying the content on different screens of the MLD system.

According to one exemplary embodiment, an instrument panel comprises a multi-layer display including a first screen and a second screen arranged in a substantially parallel manner, the first screen and the second screen including an array of pixels and the second screen overlapping the first screen; a light configured to provide light to the first screen and the second screen of the multi-layer display; and a processing system comprising at least one processor and memory. The processing system is configured to: receive three dimensional data representing an object including a plurality of vertices; for each vertex of the plurality of vertices of the object, scale a distance between the vertex and a front plane provided at a vertex of the object closest to a viewpoint, and move the vertex to an intersection between (1) a reference plane, that is parallel to the front plane and provided at the scaled distance, and (2) a line between the vertex and the viewpoint; generate a first image based on a first set of moved vertices of the object and a second image based on a second set of moved vertices of the object; and simultaneously display the first image on the first screen and the second image on the second screen.

In another exemplary embodiment, the processing system is configured to, for each vertex of the object behind the front plane as viewed from the viewpoint, scale a distance between the vertex and a front plane provided at a vertex of the object closest to a viewpoint, and move the vertex to an intersection between (1) a reference plane, that is parallel to the front plane and provided at the scaled distance, and (2) a line between the vertex and the viewpoint.

In another exemplary embodiment, the distance between the vertex and the front plane is scaled by a factor between 0 and 1.

In another exemplary embodiment, the distance between the vertex and the front plane is scaled by a factor predetermined for the multi-layer display.

In another exemplary embodiment, the distance between the vertex and the front plane is scaled by a factor predetermined for the multi-layer display.

In another exemplary embodiment, the second screen is a touch sensitive display, and the processing system is configured to detect whether a touch input is performed to a portion of the second screen, and adjust a scaling factor for scaling the distance between the vertex and the front plane.

In another exemplary embodiment, the multi-layer display, the light, and the processing system are commonly housed.

In another exemplary embodiment, the processing system is further configured to display text and/or graphics on the first screen and/or the second screen simultaneously with the first and second images in an overlapping manner with at least a portion of the first image and/or the second image.

According to one exemplary embodiment, a multi-layer display system comprises: a first display panel and second display panel arranged in a substantially parallel manner, the second display panel overlapping the first display panel; a backlight configured to provide light to the first display panel and the second display panel; and a processing system comprising at least one processor and memory. The processing system is configured to: receive data including vertices information of three-dimensional content; for each vertex of the three-dimensional content behind a zero plane in a virtual space viewed from a viewpoint, move the vertex along a line between the vertex and a viewpoint; generate a first image based on a first set of the moved vertices and a second image based on a second set of moved vertices; and simultaneously display the first image on the first display panel and the second image on the second display panel.

In another exemplary embodiment, the respective vertex is moved along the line between the vertex and the viewpoint such that the moved vertex is provided at an intersection of the line with a reference plane provided between the vertex and the zero plane.

In another exemplary embodiment, the respective vertex is moved along the line toward the viewpoint a distance that is determined based on the distance the respective vertex is away from the zero plane.

In another exemplary embodiment, the respective vertex is moved along the line toward the viewpoint to a point where the line intersects a reference plane provided at a distance from the zero plane that is a scaling factor of the distance the respective vertex is from the zero plane.

In another exemplary embodiment, the scaling factor is a value between 0 and 1.

In another exemplary embodiment, the scaling factor is determined based on the distance between the first display panel and the second display panel.

In another exemplary embodiment, the second display panel is a touch sensitive display, and the processing system is configured to detect whether a touch input is performed to a portion of the second display panel, and adjust the scaling factor for scaling the distance between the vertex and the zero plane.

In another exemplary embodiment, the first display panel, the second display panel, the backlight, and the processing system are disposed within a same housing.

In another exemplary embodiment, the processing system is further configured to display text and/or graphics on the second display panel simultaneously with the first and second images in an overlapping manner with at least a portion of the first image and/or the second image.

According to one exemplary embodiment, a method for displaying content on a multi-layer display system including at least a first screen and a second screen arranged in a substantially parallel and overlapping manner, comprises: receiving three dimensional data representing an object including a plurality of vertices; for each vertex of the plurality of vertices of the object, scaling a distance between the vertex and a front plane provided at a vertex of the object closest to a viewpoint, and moving the vertex to an intersection between (1) a reference plane, that is parallel to the front plane and provided at the scaled distance, and (2) a line between the vertex and the viewpoint; generating a first image based on a first set of moved vertices of the object and a second image based on a second set of moved vertices of the object; and simultaneously displaying the first image on the first screen and the second image on the second screen.

In another exemplary embodiment, the method includes, for each vertex of the object behind the front plane as viewed from the viewpoint, scale a distance between the vertex and a front plane provided at a vertex of the object closest to a viewpoint, and move the vertex to an intersection between (1) a reference plane, that is parallel to the front plane and provided at the scaled distance, and (2) a line between the vertex and the viewpoint.

According to one exemplary embodiment, non-transitory computer-readable medium storing an information processing program for generating images for display on a multi-layer display system including a processor, a first screen, and a second screen arranged in a substantially parallel manner, the first screen and the second screen including an array of pixels and the second screen overlapping the first screen, the information processing program, when executed by the processor causes the multi-layer display system to at least: receive three dimensional data representing an object including a plurality of vertices; for each vertex of the plurality of vertices of the object, scale a distance between the vertex and a front plane provided at a vertex of the object closest to a viewpoint, and move the vertex to an intersection between (1) a reference plane, that is parallel to the front plane and provided at the scaled distance, and (2) a line between the vertex and the viewpoint; generate a first image based on a first set of moved vertices of the object and a second image based on a second set of moved vertices of the object; and simultaneously display the first image on the first screen and the second image on the second screen.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Certain example embodiments relate to Multi-Layer Displays (MLDs), and/or methods of relating to their operation.

More particularly, certain example embodiments provide improvements to displaying three-dimensional content on MLD system by applying perspective distortion to the content. While the discussion below is made with regard to content display on MLD system, embodiments of this disclosure are not so limited, and may be applied to other systems displaying three-dimensional content.

By performing perspective distortion, embodiments of this disclosure can automatically bake the desired aspects of perspective into a physically thin object, thus gaining the advantages of both approaches discussed in the background section. To achieve this, the object's vertices are moved along lines drawn through a fixed point in space (our primary viewpoint). From this viewpoint, regardless of any perspective distortion applied, the object will appear to not change.

Figure 1A:
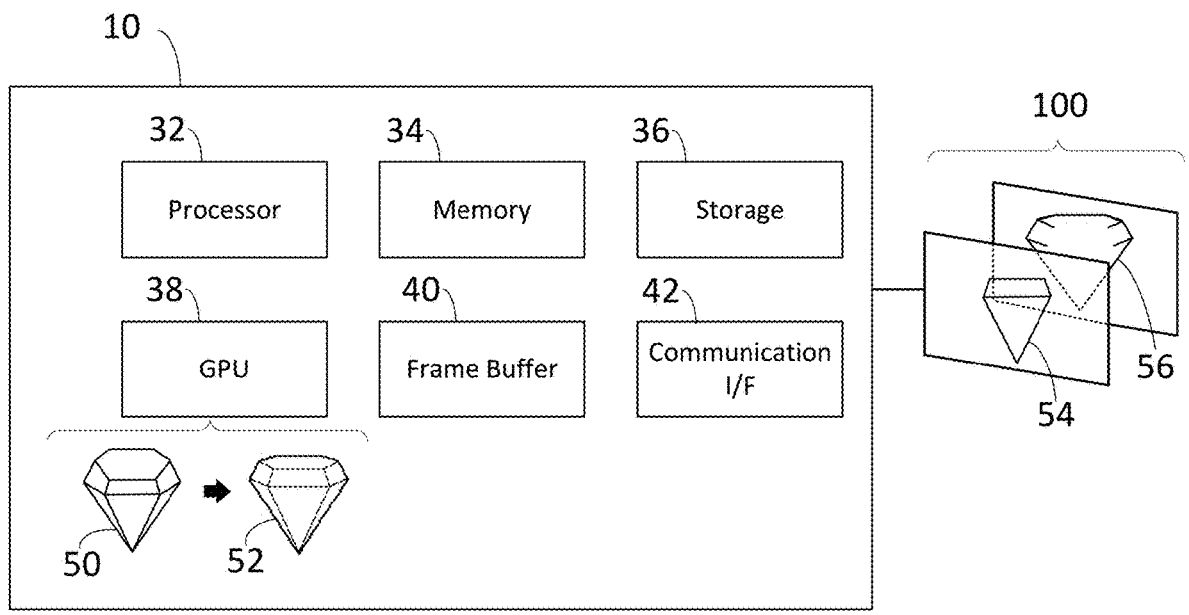
FIG. 1A illustrates a block diagram of a system for controlling an example MLD in accordance with certain example embodiments.

FIG. 1A illustrates a block diagram of a system 10 for controlling an example MLD in accordance with certain example embodiments. It will be appreciated that the system 10 shown in FIG. 1 is provided by way of example and that a number of different systems including, but not limited to, embedded computer systems, vehicle dashboard display systems, portable and hand-held computer systems, mobile phones, and/or other electronic device types may be used to implement aspects of the example embodiments described herein. The system 30 includes at least one processor 32 that is operably coupled to the memory 34, e.g., via a data bus or the like. The at least one processor 32 and the memory 34 at least partially form processing resources of the system 10, and the at least one processor 32 may comprise a hardware processor (e.g., a central processing unit (CPU) or other type of processor). Depending on the configuration and/or type of computer system environment, the memory 34 may comprise volatile memory (e.g., RAM), non-volatile memory (e.g., ROM, flash memory, etc.), or some combination of the two. Additionally, memory 34 may be removable or non-removable in example embodiments. The system 10 may also have additional storage 36 (which may be removable, non-removable, and/or the like). In some embodiment, the additional storage may be provided in a different device and/or location from the components of system 10.

As shown in FIG. 1A, the system 30 can communicate with other systems, components, and/or devices via a communication interface 42. Communication interface 42 may include computer-readable instructions, data structures, program modules, and/or other data in a modulated data signal (e.g., a carrier wave) or other transport mechanism, as well as hardware for sending and/or receiving the same. By way of example, the communication interface 42 may couple to and/or include wired media (e.g., a wired network, direct-wired connection, etc.) and/or wireless media (e.g., a wireless network, a wireless connection utilizing acoustic, RF, infrared, and/or other wireless signaling, etc.). Communication ports and/or connectors (e.g., to for a LIN bus, USB connection, etc.) also may be provided in certain example embodiments.

The communication interface 42 also couples the system 10 to one or more input devices (e.g., a keyboard, mouse, pen, voice input device, touch input device, etc.). Additionally, communication interface 42 may couple the system 300 to one or more output devices (e.g., a speaker, printer, etc.).

The system 10 include a graphics processor 38 configured to receive image data and provide output to the display system 100 (e.g., MLD system or stereoscopic system). The graphics processor 308 may perform graphics processing operations on graphical image data stored in a frame buffer 40 or another memory location (e.g., memory 34, storage 36, and/or the like) of the system 10. Graphical data stored in the frame buffer 40 may be accessed, processed, and/or modified by components (e.g., graphics processor 38, processor 32, and/or the like) of the system 10, and/or components of other systems/devices. It will be appreciated that the graphics processor 38 may include the frame buffer 40 in certain example embodiments. It also will be appreciated that the graphics processor 38 may be implemented as a GPU or other structure separate from the processor 32 in certain example embodiments. In other example embodiments, the graphics processor 38 may be collocated with, or implemented as a part of, the processor 32.

The system 10 may be configured to apply perspective distortion to content according to the embodiments of the present disclosure. For example, the graphics processor 38 may be programmed to execute processing tasks to apply perspective distortion to content before it is displayed on the display 100. As shown in FIG. 1A, the graphics processor 38 may apply specific processes to the image data 50 to generate new transformed image data 52. The graphics processor 38 may further process the transformed image data to generate image data for different displays of a display 100. For example, the graphics processor 38 may generate first content 54 for display on a first screen of the display 100 and generate second content 56 for display on a second screen of the display 100. The first content may correspond to a first portion of the transformed content and the second content may correspond to a second portion of the transformed content 52.

Figure 1B:
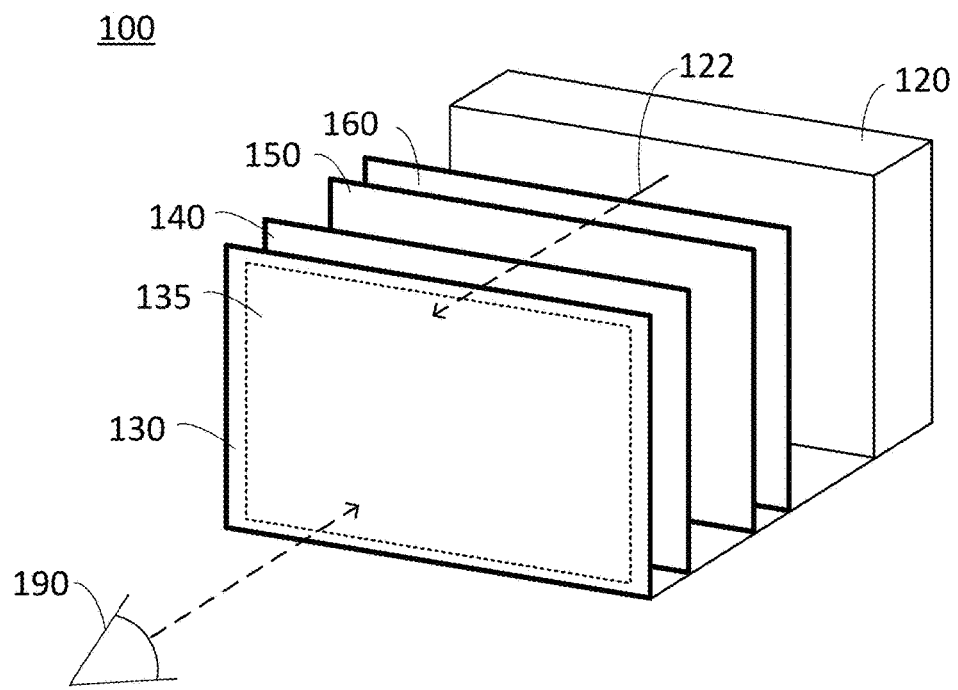
FIG. 1B illustrates a multi-layer display system according to an embodiment of the present disclosure.

FIG. 1B illustrates a multi-layer display system 100 according to an embodiment of the present disclosure. The display system 100 may include a light source 120 (e.g., rear mounted light source, side mounted light source, optionally with a light guide), and a plurality of display screens 130-160. Each of the display screens 130-160e may include multi-domain liquid crystal display cells.

The display screens 130-160 may be disposed substantially parallel or parallel to each other and/or a surface (e.g., light guide) of the light source 120 in an overlapping manner In one embodiment, the light source 120 and the display screens 130-160 may be disposed in a common housing. The display apparatus 100 may be provided in an instrument panel installed in a dashboard of a vehicle. The instrument panel may be configured to display information to an occupant of the vehicle via one or more displays 130-160 and/or one or more mechanical indicators provided in the instrument panel. The displayed information may include vehicle speed, engine coolant temperature, oil pressure, fuel level, charge level, and navigation information, but is not so limited. It should be appreciated that the elements illustrated in the figures are not drawn to scale, and thus, may comprise different shapes, sizes, etc. in other embodiments.

The light source 120 may be configured to provide illumination for the display system 100. The light source 120 may provide substantially collimated light 122 that is transmitted through the display screens 130-160.

Optionally, the light source 120 may provide highly collimated light using high brightness LED's that provide for a near point source. The LED point sources may include pre-collimating optics providing a sharply defined and/or evenly illuminated reflection from their emission areas. The light source 120 may include reflective collimated surfaces such as parabolic mirrors and/or parabolic concentrators. In one embodiment, the light source 120 may include refractive surfaces such as convex lenses in front of the point source. However, the LEDs may be edge mounted and direct light through a light guide which in turn directs the light toward the display panels in certain example embodiments.

Each of the display panels/screens 130-160 may include a liquid crystal display (LCD) matrix, which a backplane that may be glass or polymer. Alternatively, the display screens 130-160 may include organic light emitting diode (OLED) displays, transparent light emitting diode (TOLED) displays, cathode ray tube (CRT) displays, field emission displays (FEDs), field sequential display or projection displays. In one embodiment, the display panels 130-160 may be combinations of either full color RGB, RGBW or monochrome panels. One or more of the display screens 130-160 may be in-plane switching mode liquid crystal display devices (IPS-LCDs). The IPS-LCD may be a crossed polarizer type with a polarizer on one side of the cells being perpendicular to a polarizer on an opposite side of the cells (i.e., transmission directions of the polarizers are placed at right angles). The display screens 130-160 are not limited to the listed display technologies and may include other display technologies that allows for the projection of light. In one embodiment, the light may be provided by a projection type system including a light source and one or more lenses and/or a transmissive or reflective LCD matrix. The display screens 130-160 may include a multi-layer display unit including multiple stacked or overlapped display layers each configured to render display elements thereon for viewing through the uppermost display layer.

In one embodiment, each of the display screens 130-160 may be approximately the same size and have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances.

The display screens 130-160 may be configured to display graphical information for viewing by the observer 190. The viewer/observer 190 may be, for example, a human operator or passenger of a vehicle, or an electrical and/or mechanical optical reception device (e.g., a still image, a moving-image camera, etc.). Graphical information may include visual display of objects and/or texts with object and/or texts in one display screen overlapping objects and/or texts displayed on another display screen. In one embodiment, the graphical information may include displaying images or a sequence of images to provide video or animations. In one embodiment, displaying the graphical information may include moving objects and/or text across the screen or changing or providing animations to the objects and/or text. The animations may include changing the color, shape and/or size of the objects or text. In one embodiment, displayed objects and/or text may be moved between the display screens 130-160. The distances between the display screens 130-160 may be set to obtain a desired depth perception between features displayed on the display screens 130-160.

In one embodiment, a position of one or more of the display screens 130-160 may be adjustable by an observer 190 in response to an input. Thus, an observer 190 may be able to adjust the three dimension depth of the displayed objects due to the displacement of the display screens 130-160. A processing system may be configured to adjust the displayed graphics and gradients associated with the graphics in accordance with the adjustment.

Each of the display screens 130-160 may be configured to receive data and display, based on the data, a different image on each of the display screens 130-160 simultaneously. Because the images are separated by a physical separation due to the separation of the display screens 130-160, each image is provided at a different focal plane and depth is perceived by the observer 190 in the displayed images. The images may include graphics in different portions of the respective display screen.

While not illustrated in FIG. 1B, the display system 100 may include one or more projection screens, one or more diffraction elements, and/or one or more filters between an observer 190 and the projection screen 160, between any two display screens 130-160, and/or the display screen 130 and the light source 120.

In certain example embodiments, some or all components of the system 10 and the example MLD of FIG. 1B may be located within a common housing. In certain example embodiments, a controller may comprise the components of the system 10 shown in FIG. 1A, with the example MLD of FIG. 1B being located remote therefrom. In certain example embodiments, the example MLD of FIG. 1B and the remaining components of FIG. 1B may be provided in different housings.

As discussed above, by performing perspective distortion, embodiments of this disclosure can automatically bake the desired aspects of perspective into a physically thin object, thus gaining the advantages of both approaches discussed in the background section. To achieve this, the object's vertices are moved along lines drawn through a fixed point in space (our primary viewpoint). From this viewpoint, regardless of any perspective distortion applied, the object will appear to not change.

Figure 2A:
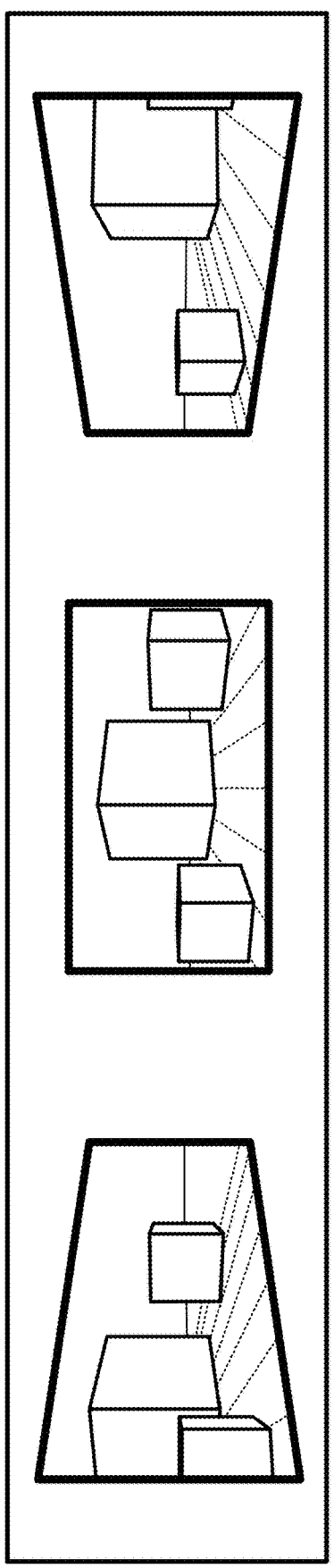
FIGS. 2A and 2B illustrate a comparison of off-angle shots between a deep scene and a perspective distorted scene.
Figure 2B:
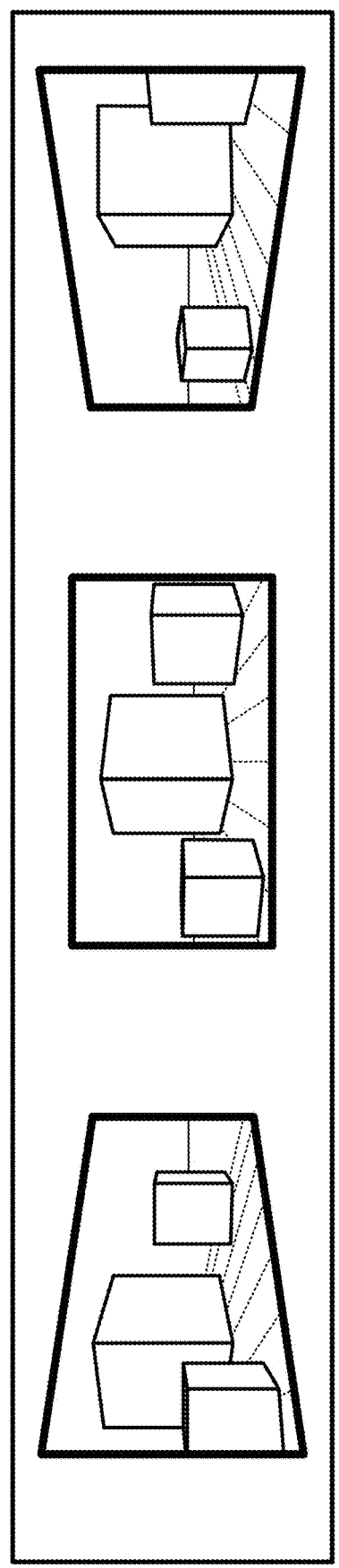

FIGS. 2A and 2B illustrate a comparison of off-angle shots between a deep scene (FIG. 2A) and a perspective distorted scene (FIG. 2B). The perspective distorted scene has been scaled in half, but could be scaled significantly smaller to further reduce the parallax.

By building a zero plane—the pivot from which we shall scale—embodiments of this disclosure can distort the object's vertices based on their depth to said plane. This plane is classically placed at the front-most vertex—this ensures that the absolute front of the object is not distorted, while still distorting the rest of the shape. All vertices have their distance to the zero plane calculated, and then have their distances scaled based on the desired thinness. When squashing an object, this is when we stop and present the object with its vertices moved to the new scaled positions (see e.g., FIG. 3C).

However, to perspective distort the object, each scaled distance is instead utilized to build a new plane (resolution plane) for each vertex. This plane is formed parallel to the zero plane, and at the new scaled depth. Embodiments of this disclosure now move the original vertex towards the primary viewpoint until it collides with the resolution plane—and this intersection point is used as the new vertex position. By applying this to all vertices in an object our new perspective distorted form is created.

Figure 3A:
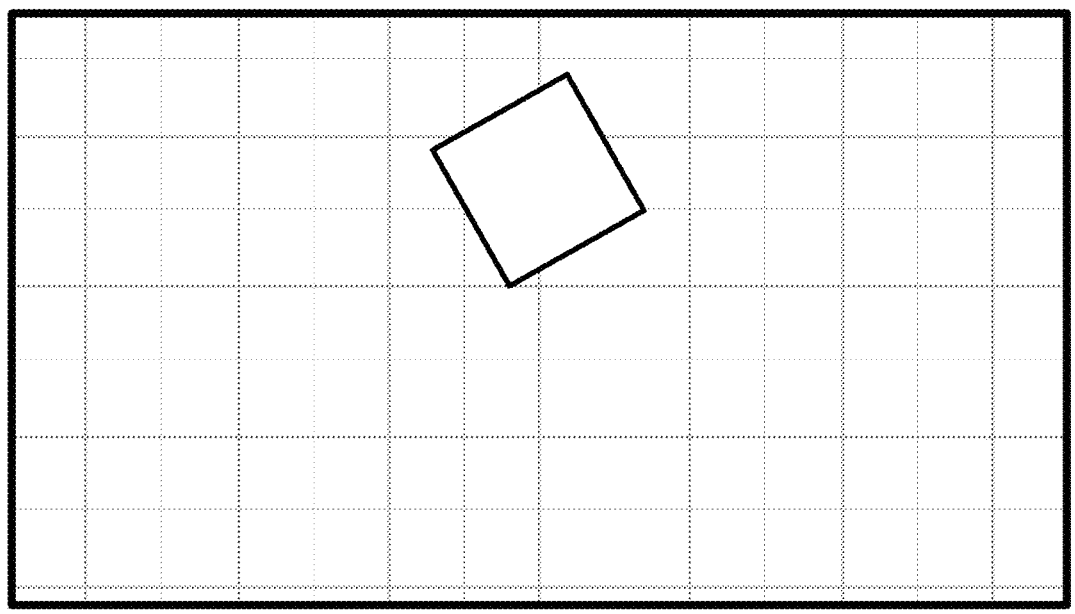
FIGS. 3A-3R illustrate a breakdown for providing a perspective distorted scene according to an embodiment of the present disclosure.
Figure 3B:
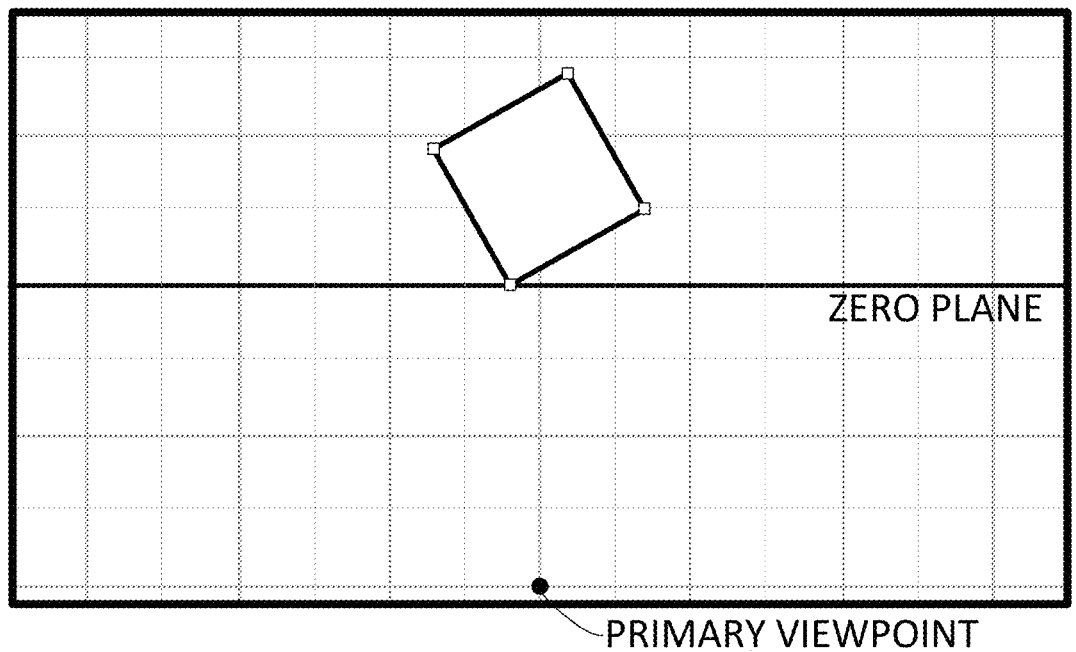
Figure 3C:
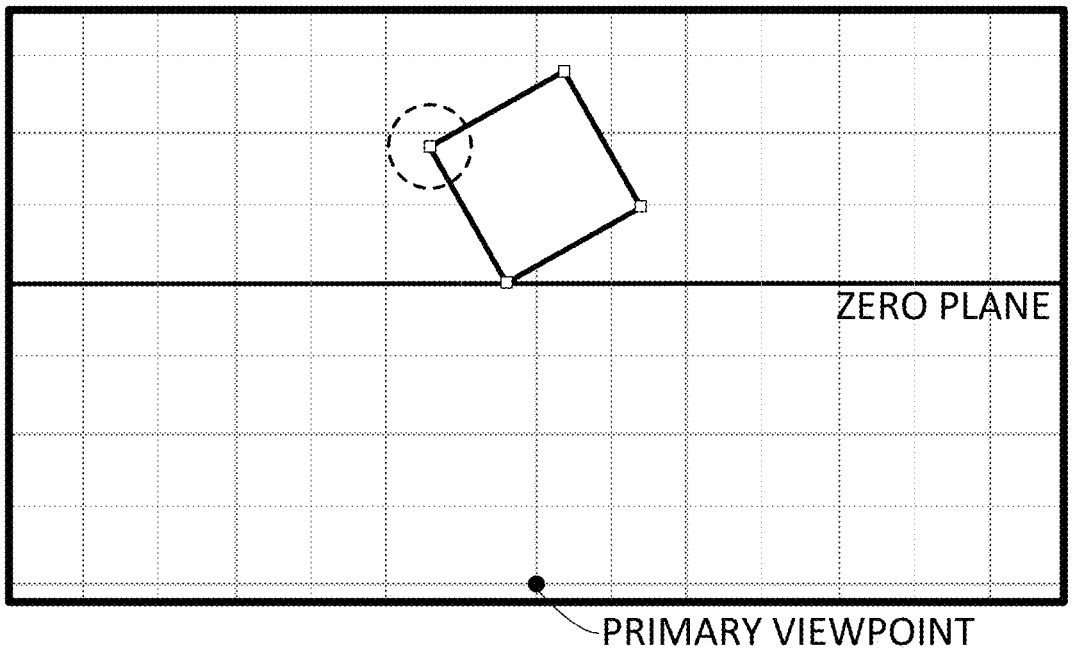
Figure 3D:
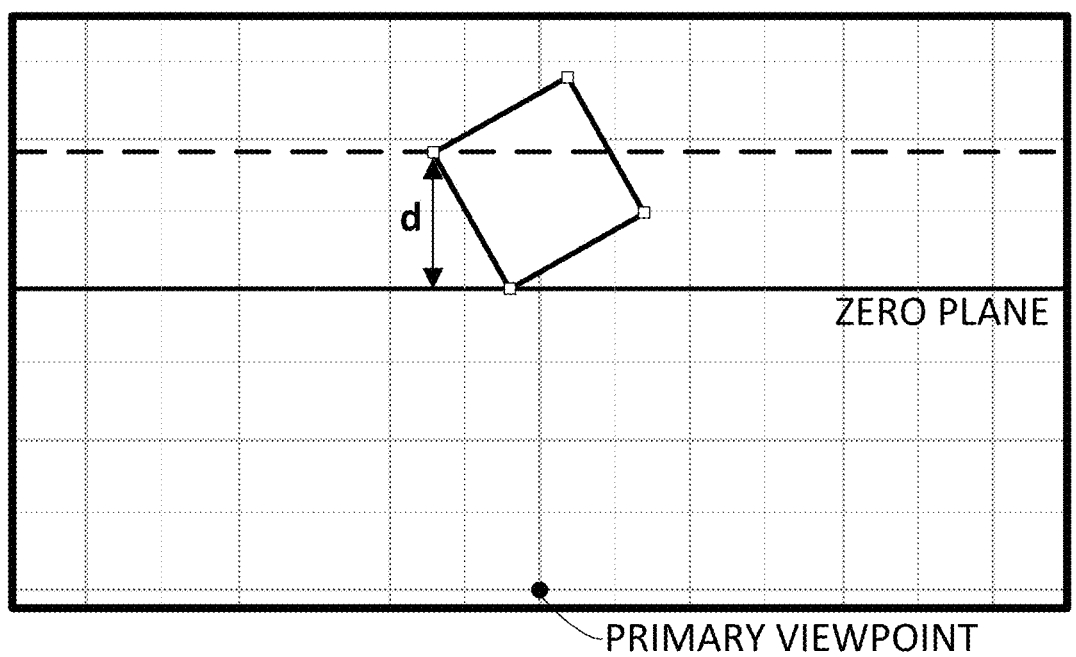
Figure 3E:
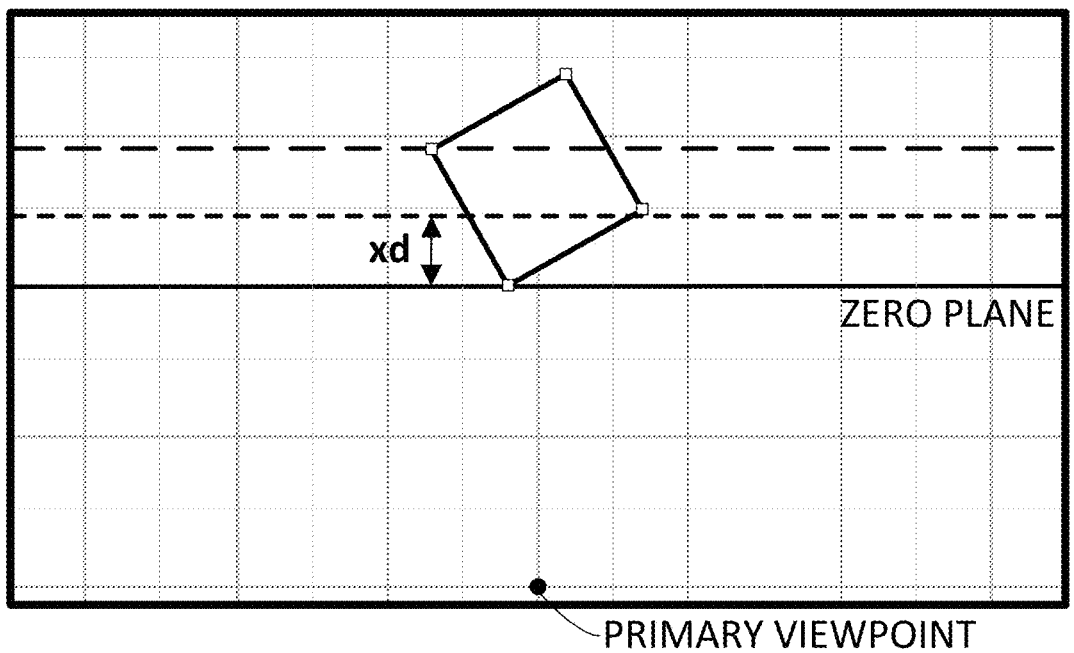
Figure 3F:
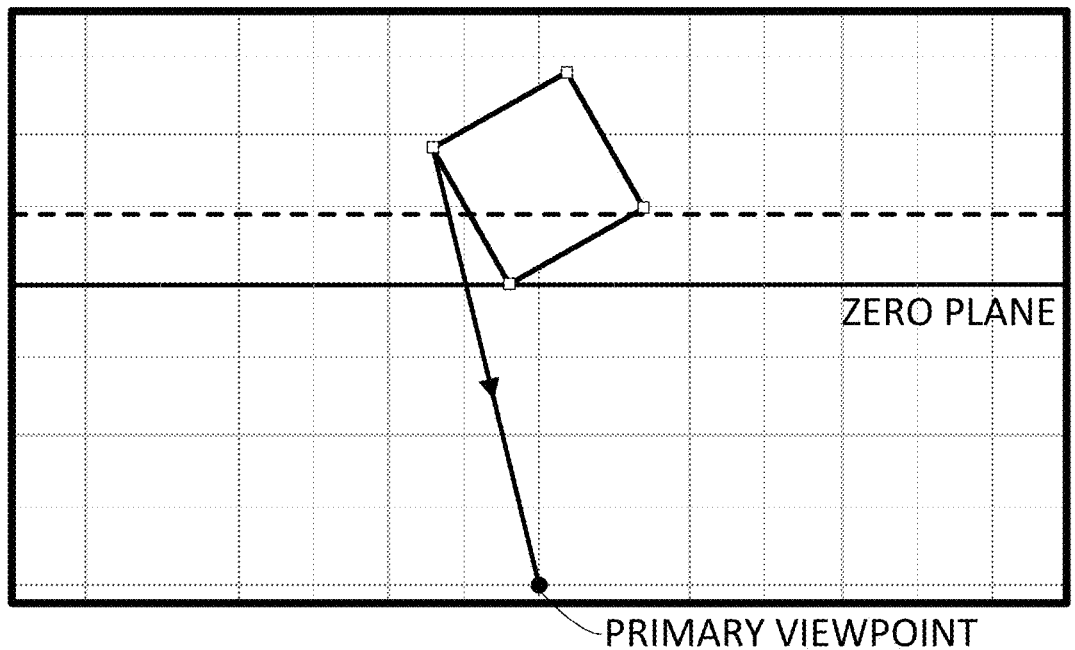
Figure 3G:
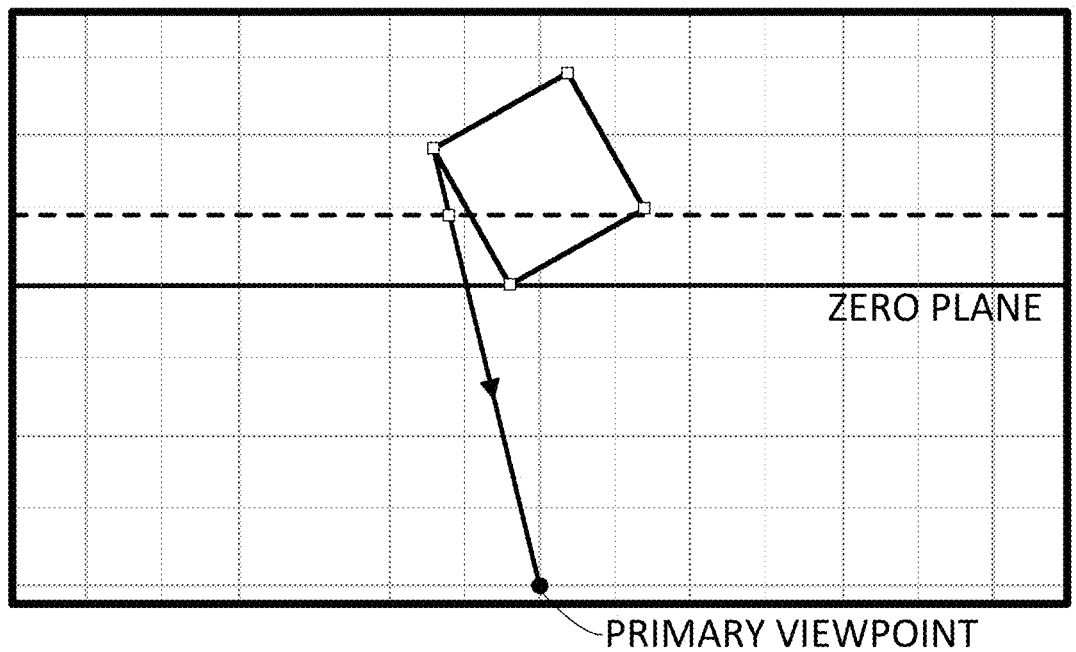
Figure 3H:
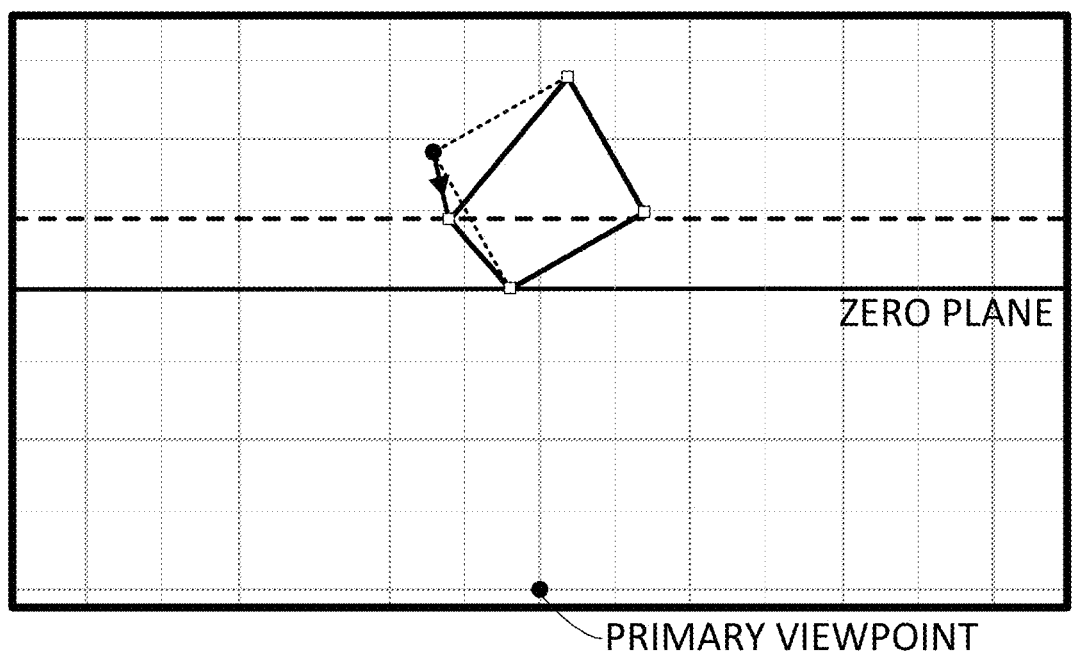
Figure 3I:
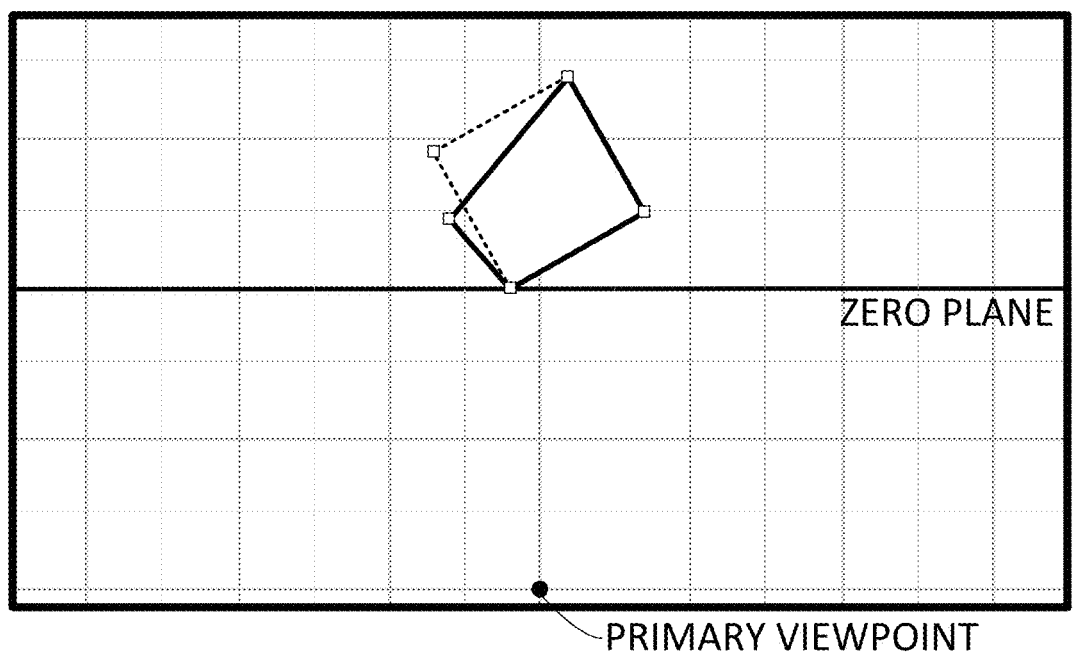
Figure 3J:
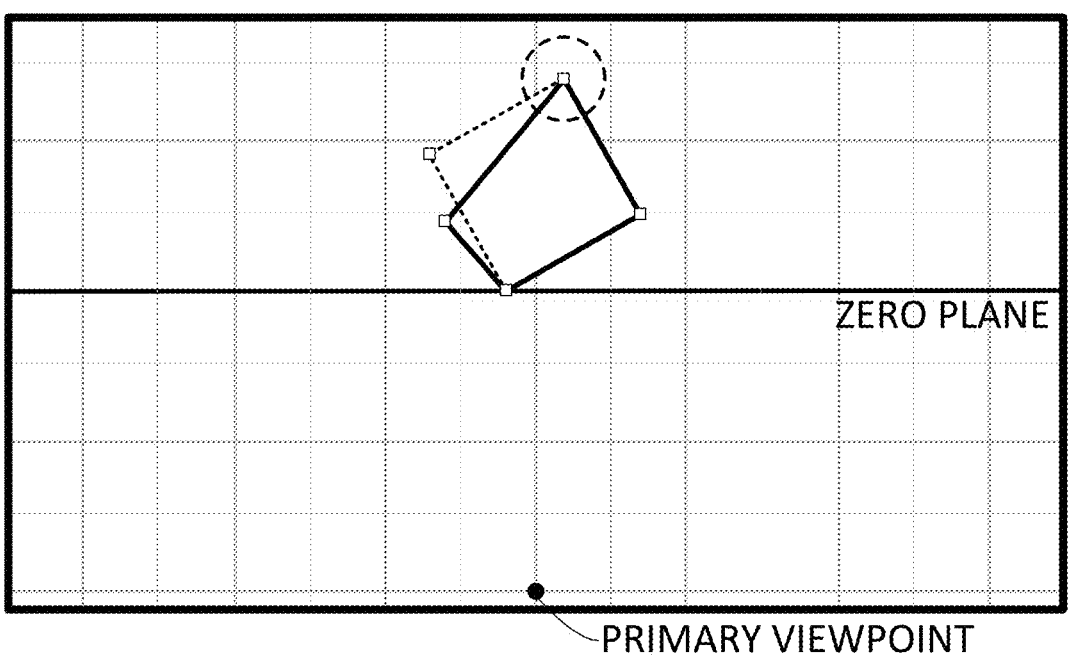
Figure 3K:
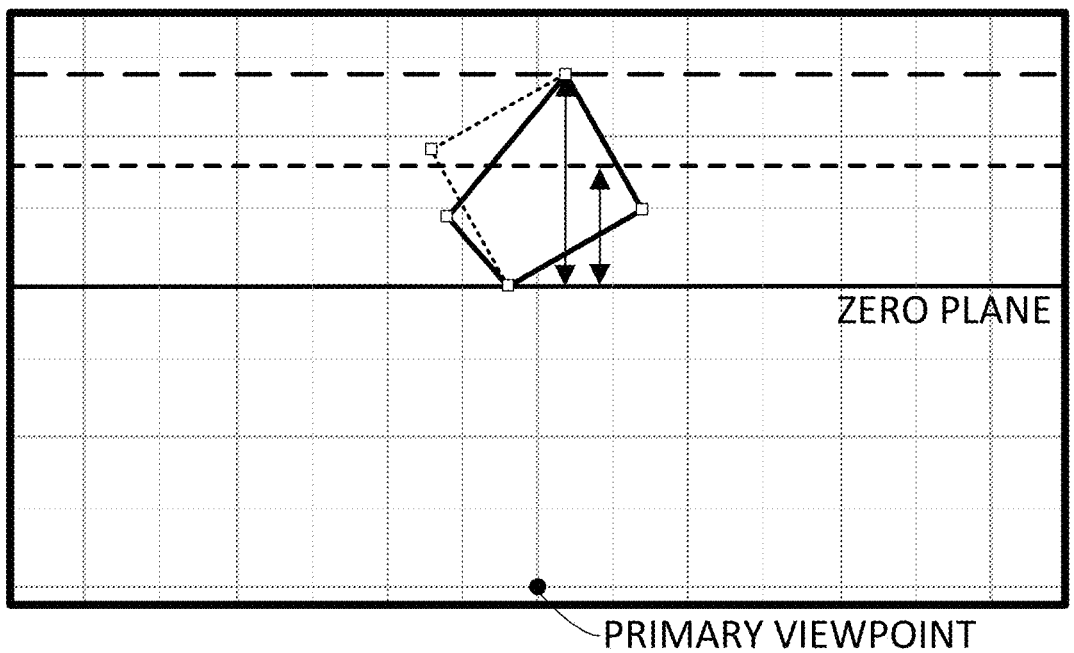
Figure 3L:
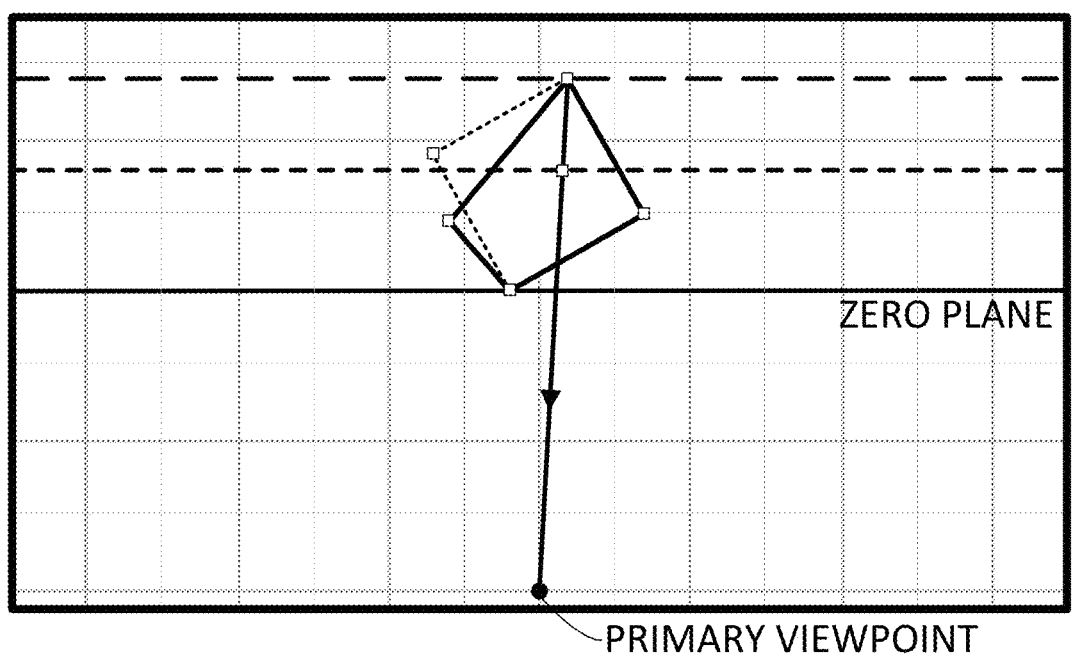
Figure 3M:
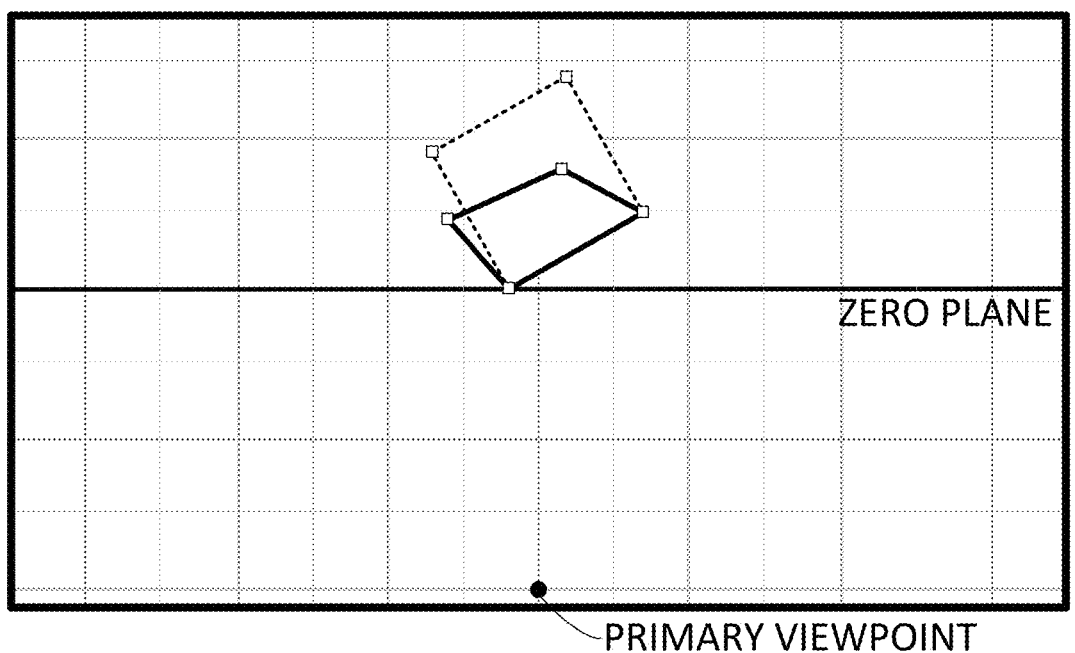
Figure 3N:
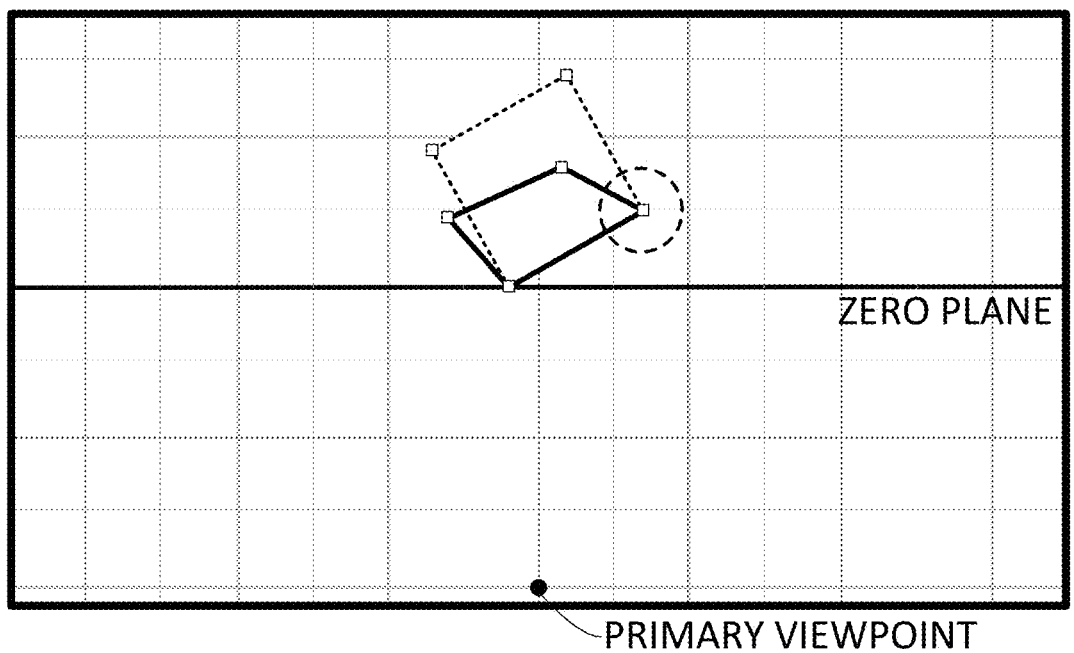
Figure 3O:
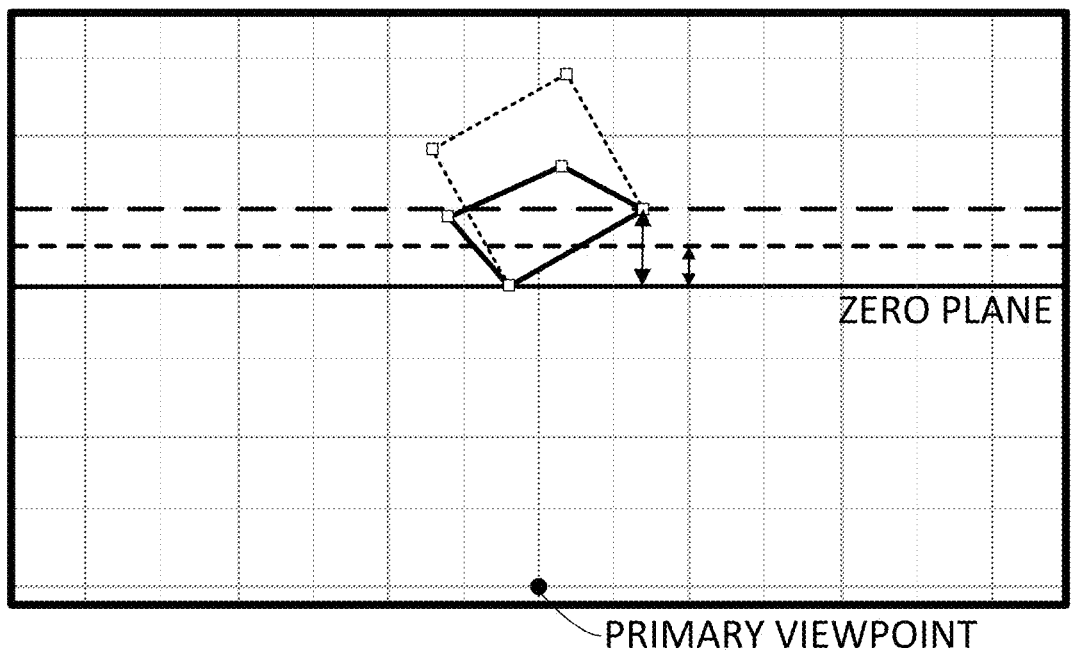
Figure 3P:
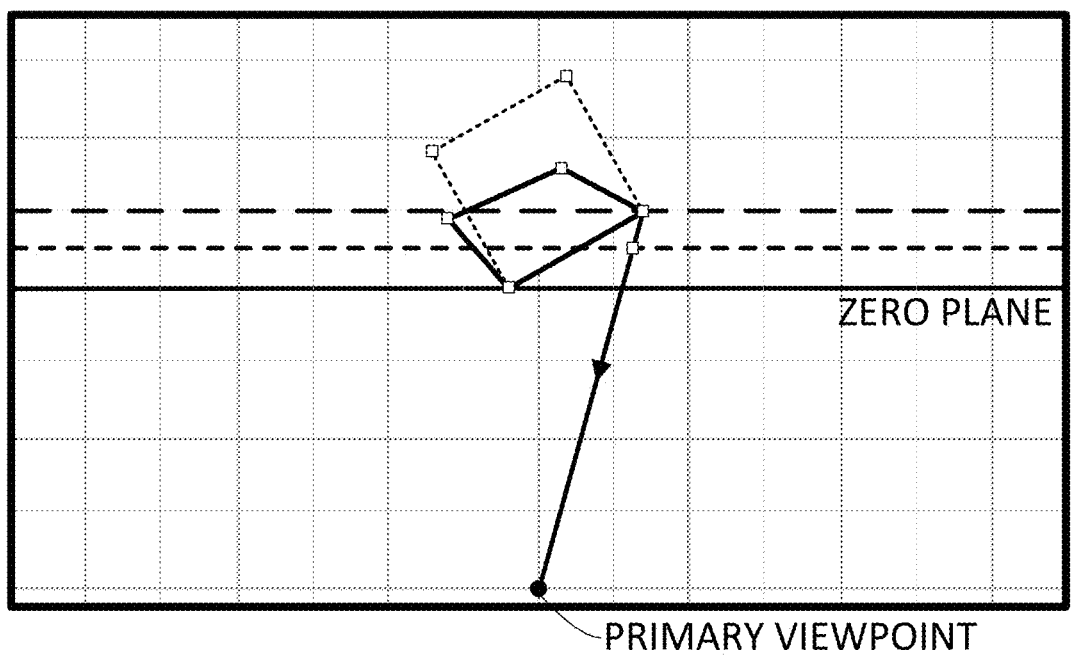
Figure 3Q:
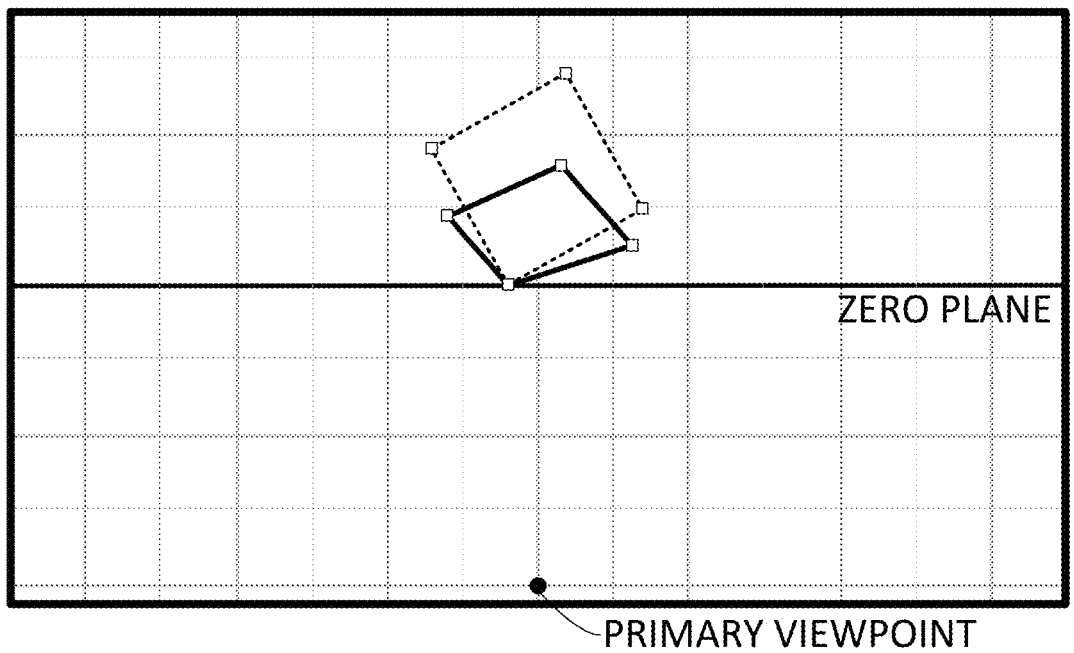
Figure 3R:
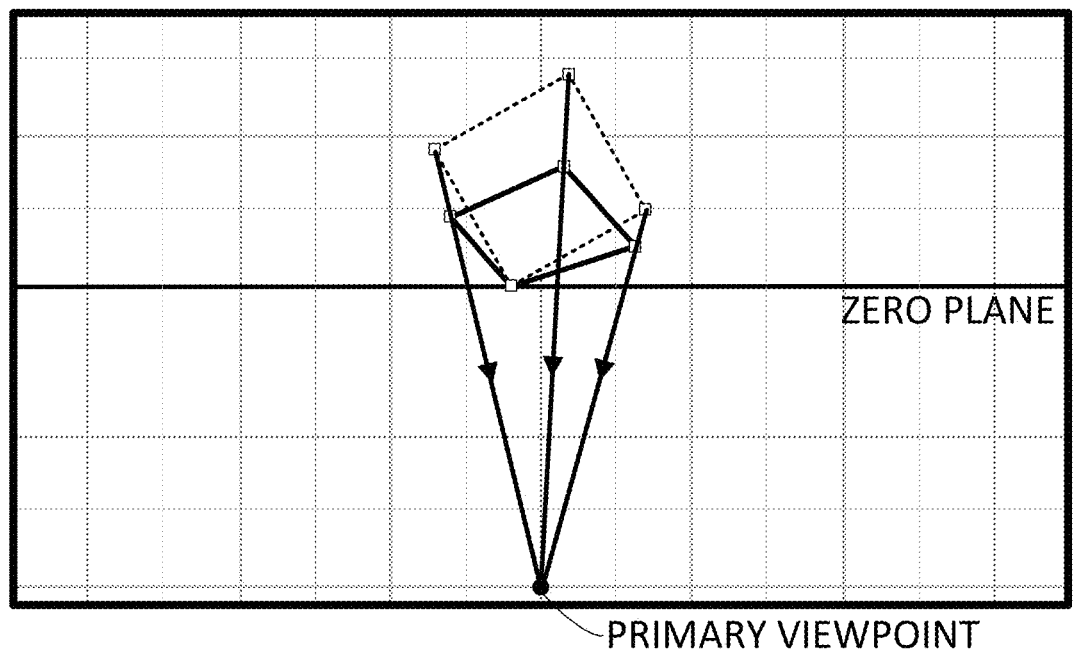

FIGS. 3A-3R illustrate a breakdown for providing a perspective distorted scene according to an embodiment of the present disclosure.

In FIG. 3A, a simple square is presented to be perspective distorted. While FIG. 3A illustrates a two dimensional square, embodiment of the present disclosure may be applied to other 2D and 3D content.

In FIG. 3B, the primary viewpoint, and zero plane are established. The primary viewpoint establishes the position from which the object will appear to be unchanging, while the zero plane is the plane from which example embodiments will measure depth. The primary viewpoint may be established in a virtual space based on perspective from which a person will be viewing the content in the real space. The primary viewpoint may be changed in response to user input (e.g., a touch input) and/or detecting movement of the person.

As shown in FIG. 3C, the first vertex is selected in the shape to perspective distort. The distance (d) from the vertex to the zero plane is calculated (see FIG. 3D). As shown in FIG. 3E, distance (d), is then multiplied by a scale (x), to generate a new depth that is then used to build another plane, parallel to the zero plane and at the new depth. In the example shown in FIG. 3E, the scale (x) is set to ½. The scale (x) may be a predetermined value set for a specific display system. For example, the scale (x) may be set based on the distance between display layers of an MLD system.

In FIG. 3F, with the new plane prepared, the example embodiments now draw a line to the primary viewpoint from the vertex. When viewed from the primary viewpoint, this line is a singular point. With both line and plane, we can calculate the intersection of the two (see FIG. 3G).

As shown in FIG. 3H, the original vertex is translated to the intersection, and the shape is deformed. FIG. 3I shows the new shape, however the other vertices still have to be deformed. The previous shape (and its original wireframe) can be seen in the dotted lines.

In FIG. 3J, the next vertex for perspective distortion is selected. In FIG. 3K, the example embodiments calculate the distance (d) to the zero plane, and then modify it by the same scale (x) again to generate the new depth that the plane is placed at. In FIG. 3L, another perspective line is drawn from the vertex to the primary viewpoint, and intersect the line with the new plane to calculate the vertex's new position. In FIG. 3M, the vertex is translated again, and the mesh is deformed once again.

In FIG. 3N, the final vertex to be manipulated is selected. Although there is another vertex (bottom-most vertex), it does not need to be perspective distorted because the distance (d) between itself and the zero plane is 0. Regardless of the scale, the vertex will not be translated along the perspective line, and therefore the calculation for it can be skipped.

In FIG. 3O, the distance (d) is calculated to the zero plane, and then modified by the same scale (x) again to generate the new depth that the plane is placed at. In FIG. 3P, another perspective line is drawn from the vertex to the primary viewpoint, and intersected with the new plane to calculate the vertex's new position.

FIG. 3Q illustrates the final vertex being translated, and the clear difference between the original and distorted shape can be seen. FIG. 3R illustrates the original and distorted shape with the perspective lines drawn. As shown in FIG. 3R, the vertices were translated from their original position to their perspective distorted form.

Despite being originally designed in the context of MLD, embodiments of this disclosure could help to mitigate accommodation and vergence issues classically presented with stereoscopic or auto-stereoscopic displays by lowering the 'real' depth while retaining the desired perspective distortion.

When applied in real-time in set contexts (i.e. vertex offsets in GPU rendering, or through a variety of other techniques), this technique can also have the benefit of retaining the normals of the object in their unresolved state —enabling more accurate lighting and shading. This is caused by utilizing the normals of the original object (i.e. before distortion), instead of recalculating from the object's new distorted form.

Figure 4:
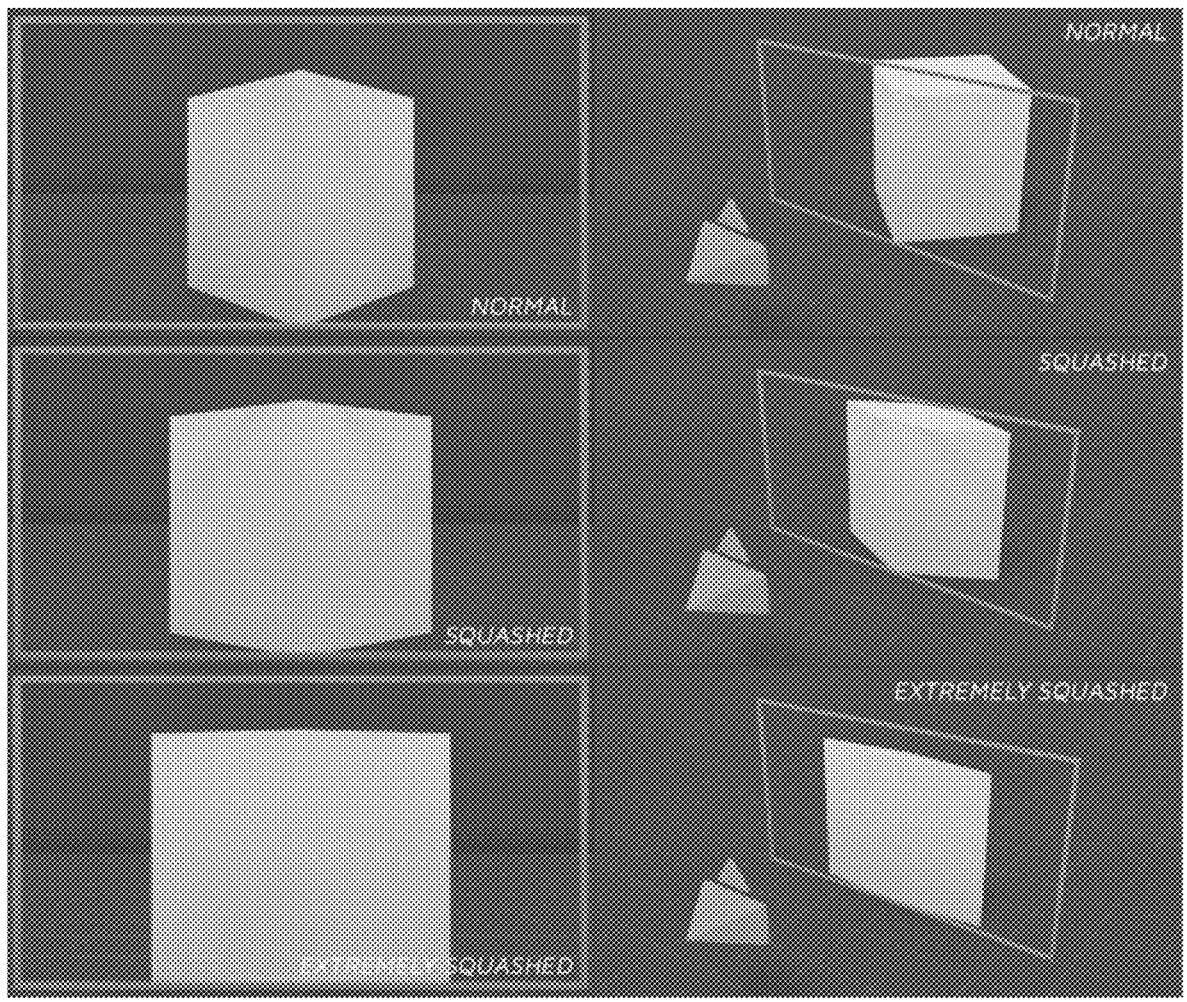
FIGS. 4 and 5 illustrate the advantages of retaining the normal of the object in their unresolved state according to an embodiment of the present disclosure.
Figure 5:
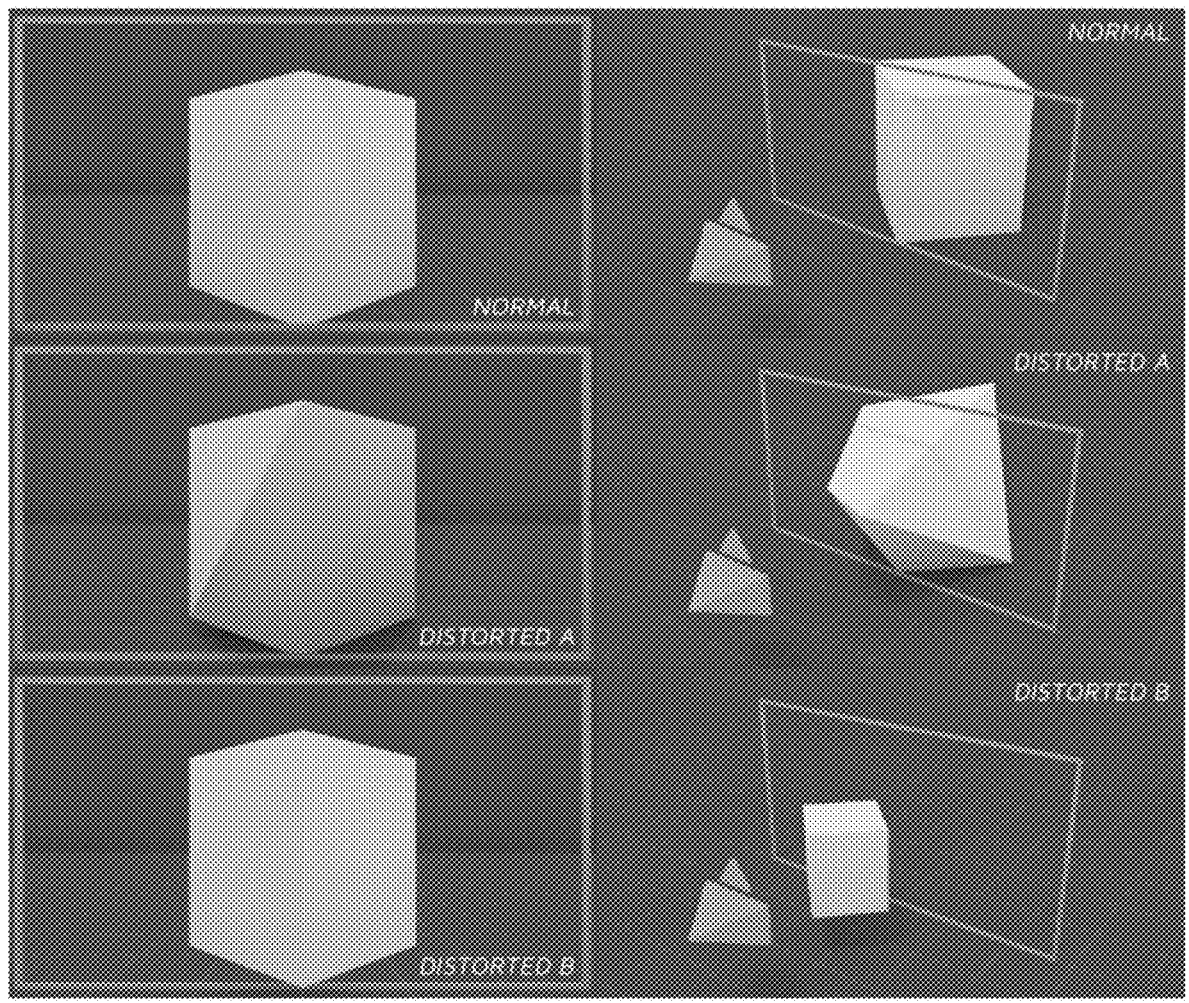

FIGS. 4 and 5 illustrate the advantages of retaining the normal of the object in their unresolved state according to an embodiment of the present disclosure.

In FIG. 4, a simple object is squashed to show how the object's original perspective is lost as its depth decreases (the second row is at half depth, the third is at one tenth depth). As shown in FIG. 4, although the extremely squashed shape shows almost complete degradation of perspective cues, the squashed suffers from the same issue, albeit to a lesser degree.

FIG. 5 illustrates that by translating vertices in the original shape (seen in the top row) along the lines to the primary viewpoint (seen as the camera), example embodiments can create shapes and objects that are vastly different yet form the same silhouettes from the primary viewpoint (seen in the first column). Note that the only clues that these forms are altered is the difference in shading, lighting, shadows, and occlusion.

Figure 6:
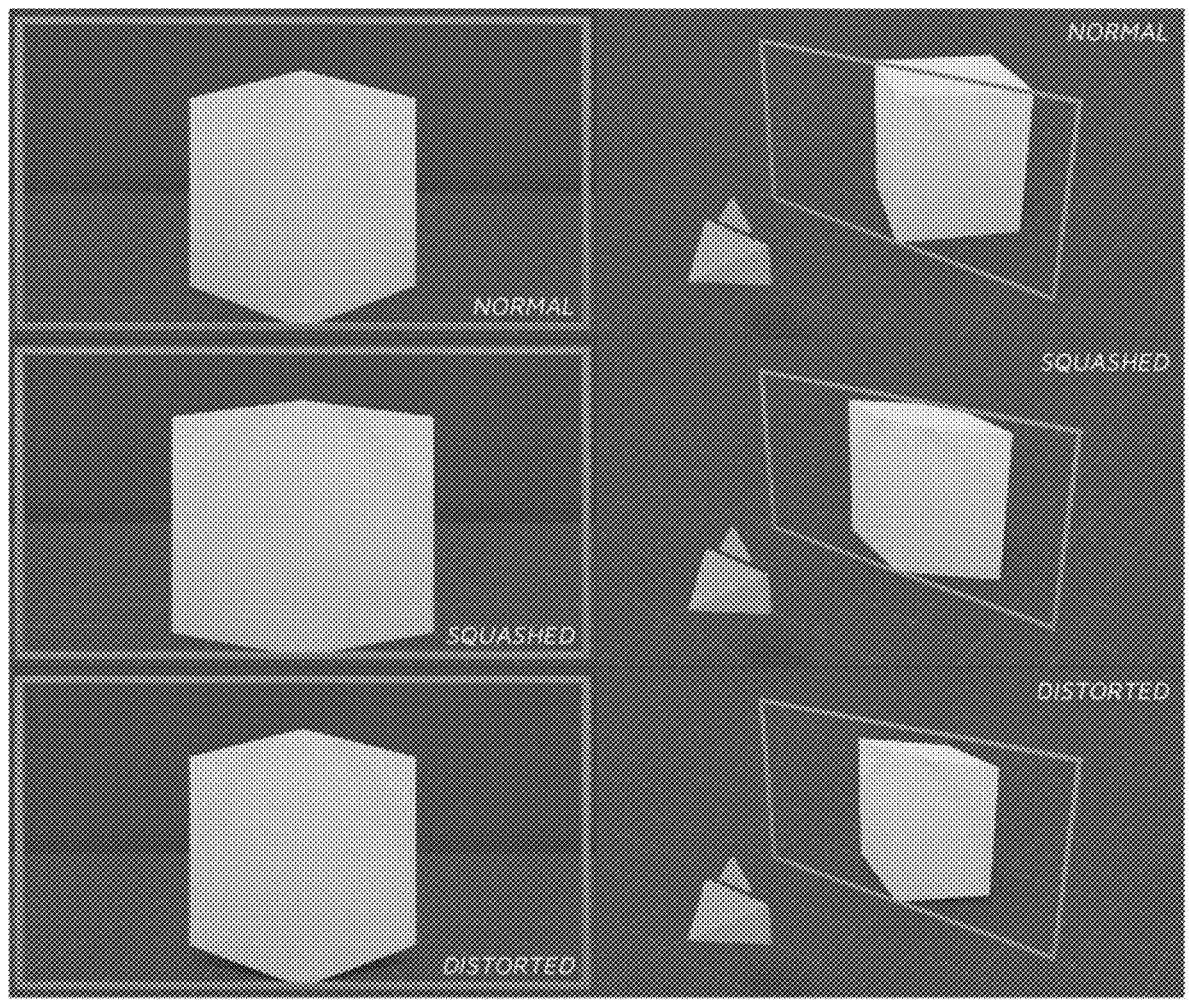
FIG. 6 illustrates a simple mesh presented normally, as well as the results from squashing and perspective distortion.

FIG. 6 illustrates that a simple mesh presented normally, as well as the results from squashing and perspective distortion. Note that from the viewpoint of the camera (seen in the left column), the normal and distorted images are identical geometrically, while the squashed is not. From the secondary viewpoint (seen in the right column), we can see the subtle but important differences in geometry between the squashed and distorted forms.

Figure 7:
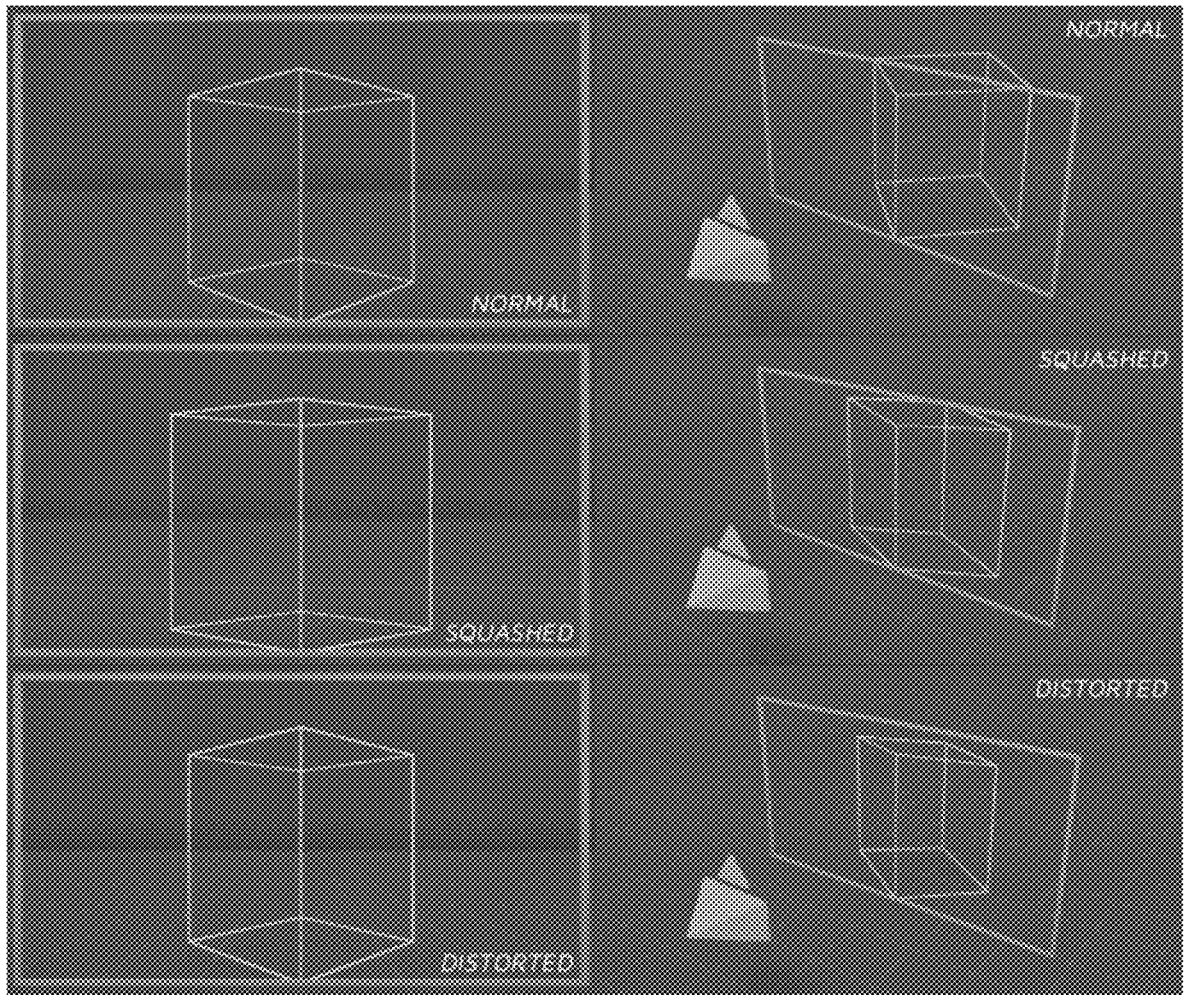
FIG. 7 illustrates a wireframe representation of FIG. 6.

In FIG. 7, the same mesh from FIG. 6 is represented again in wireframe form to accentuate the subtlety of differences between the squashed and distorted forms—notably, the back edge and side edges of the distorted cube are shorter than their squashed counterparts, and are raised off of the ground, whereas the front edge is identical across the distorted, squashed, and normal forms—in the former, as it is touching the zero plane it's distortion distance is 0, and therefore remains in place.

Figure 8:
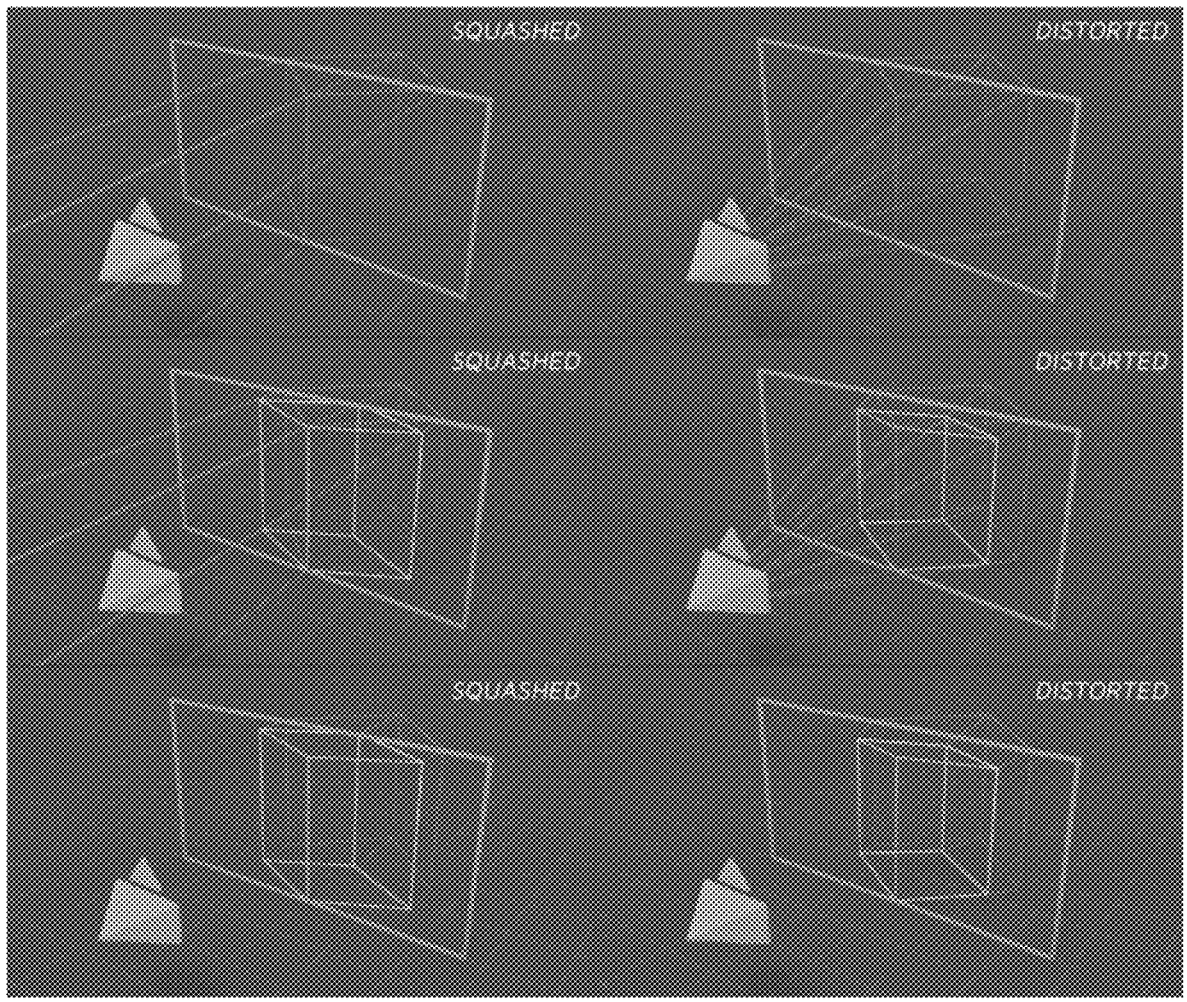
FIG. 8 illustrates a breakdown of steps to perspective distort or squash the simple mesh presented in FIGS. 6 and 7.

FIG. 8 illustrates a breakdown of steps to perspective distort or squash the simple mesh presented in FIGS. 6 and 7. After drawing the translation lines (seen in the first row), the mesh's vertices are translated along them based on the distance to the zero plane (symbolized by the orange frame), resulting in the final form (seen in the third row).

Figure 9A:
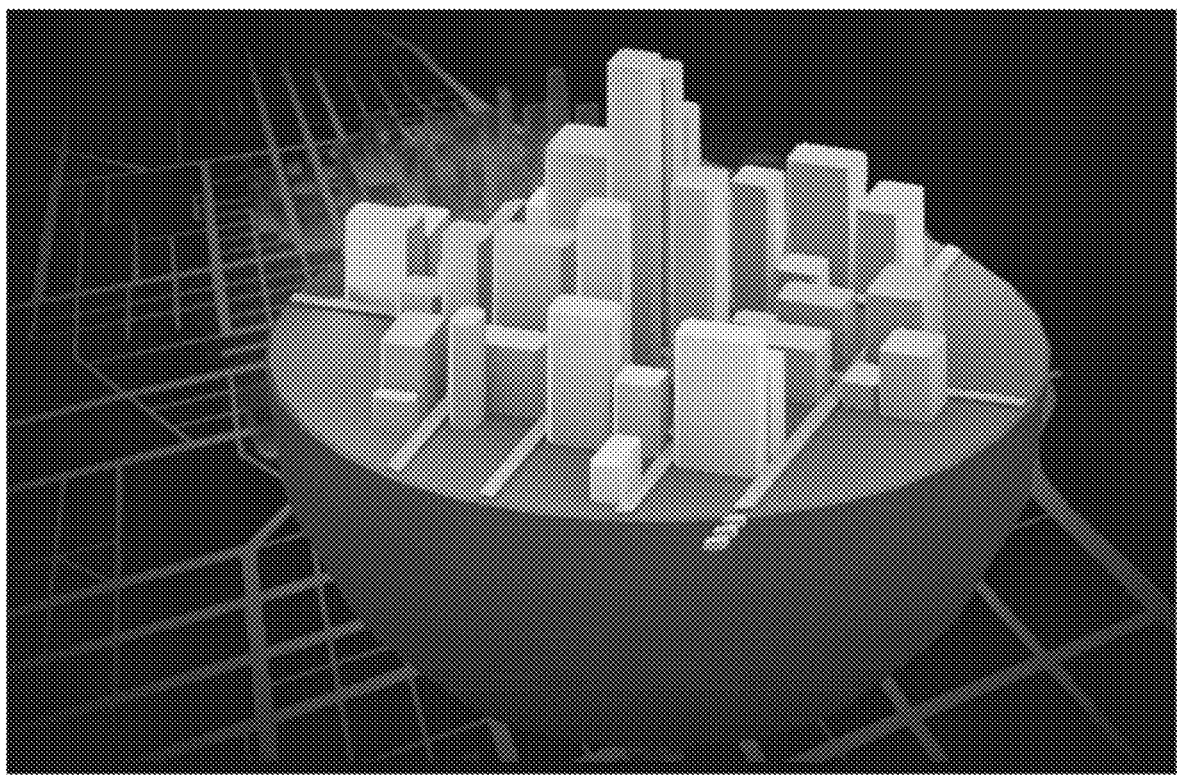
FIGS. 9A and 9B illustrate differences between squashed objects and objects to which perspective distorted is applied according to embodiments of the present disclosure.
Figure 9B:
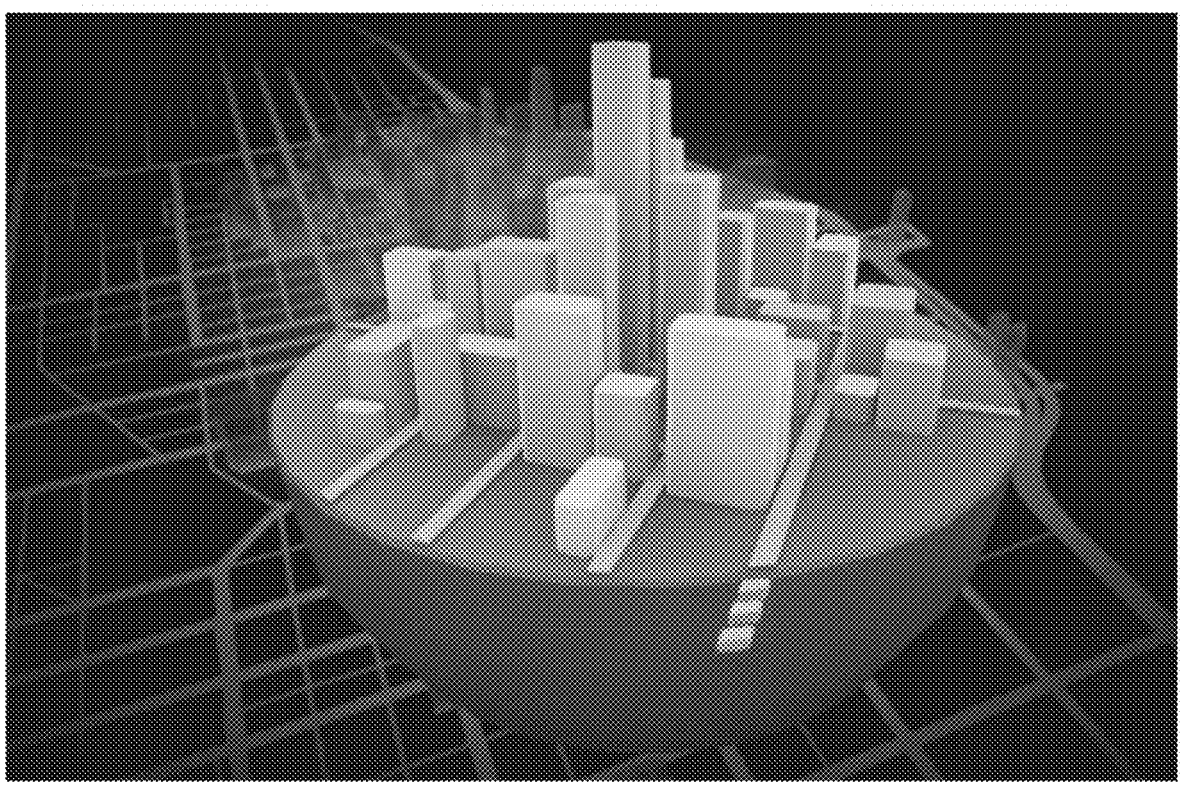

FIGS. 9A and 9B illustrate differences between squashed objects and objects to which perspective distorted is applied according to embodiments of the present disclosure. The complex example in FIGS. 9A and 9B shows the importance of perspective distortion. FIG. 9A shows the object squashed to fit within depth. FIG. 9B shows perspective distortion applied to fit within depth. The shading would normally be incorrect in the squashed example if done naively, but was corrected to highlight the perspective differences between the two approaches.

Figure 10A:
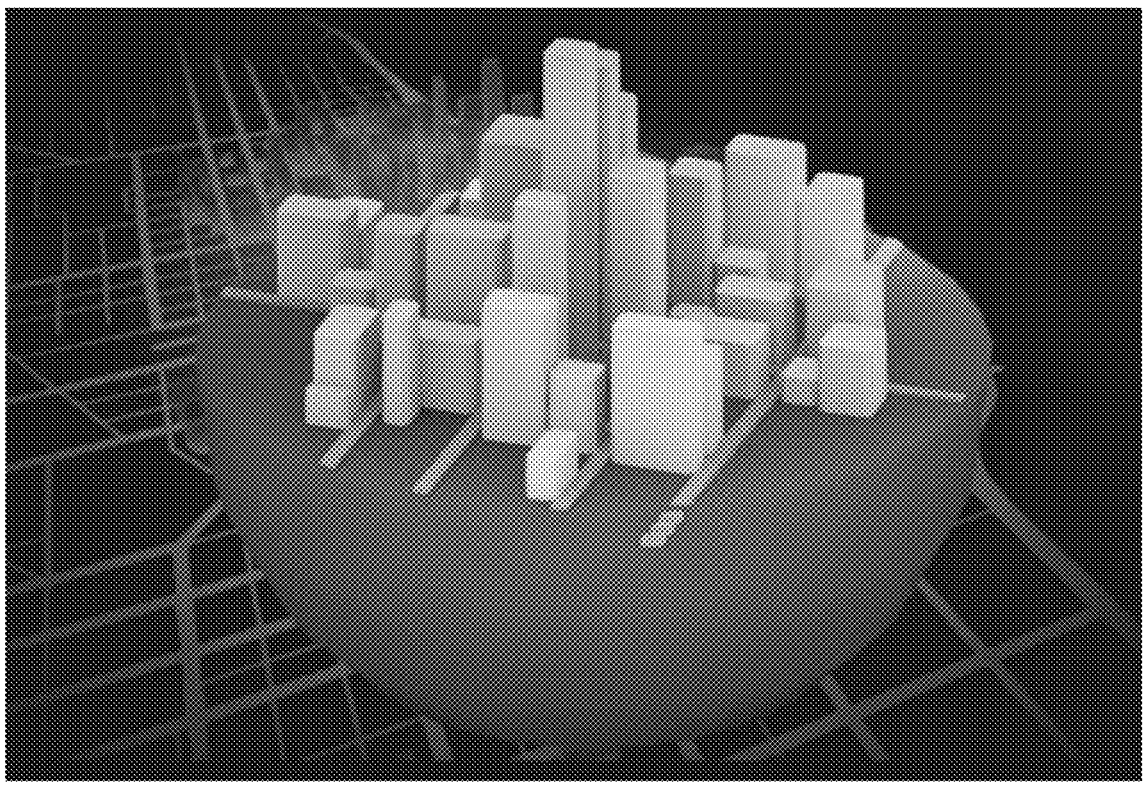
FIGS. 10A and 10B illustrate an example of how squashing in a conventional fashion "removes" lighting effects due to the squashing of normals.
Figure 10B:
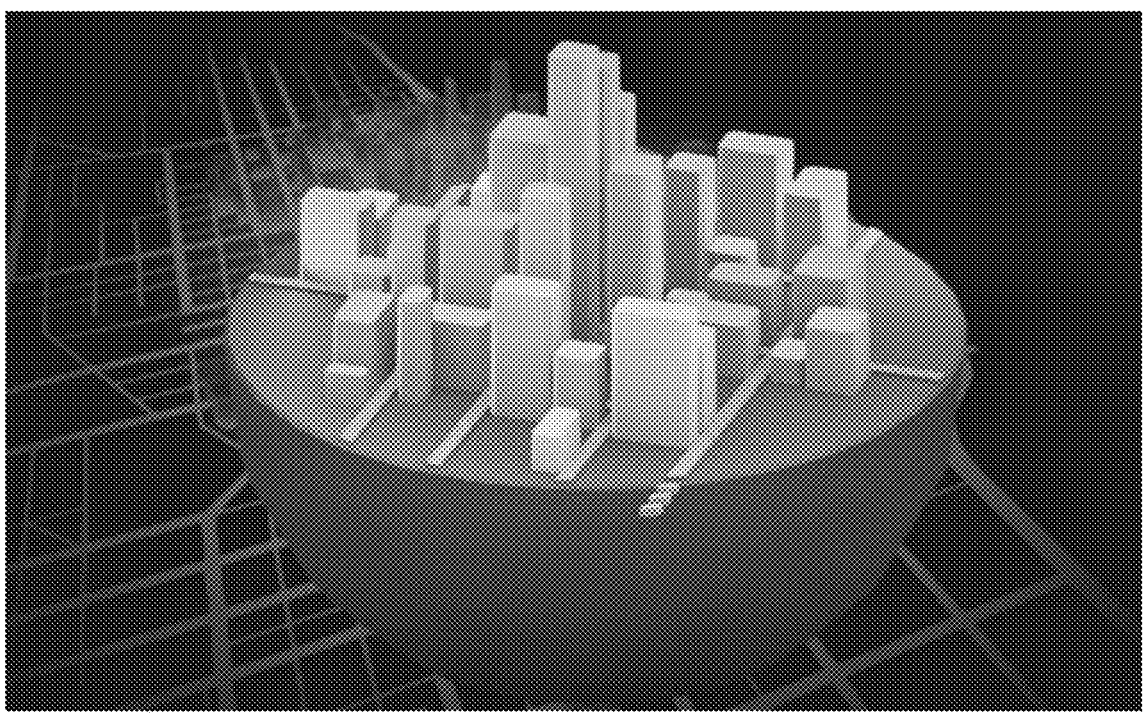

FIGS. 10A and 10B illustrate an example of how squashing in a conventional fashion "removes" lighting effects due to the squashing of normals —both objects are lit identically and are physically the same shapes. FIG. 10A shows the classic naive squashing. FIG. 10B shows corrected squashing with unresolved normals.

Figure 11:
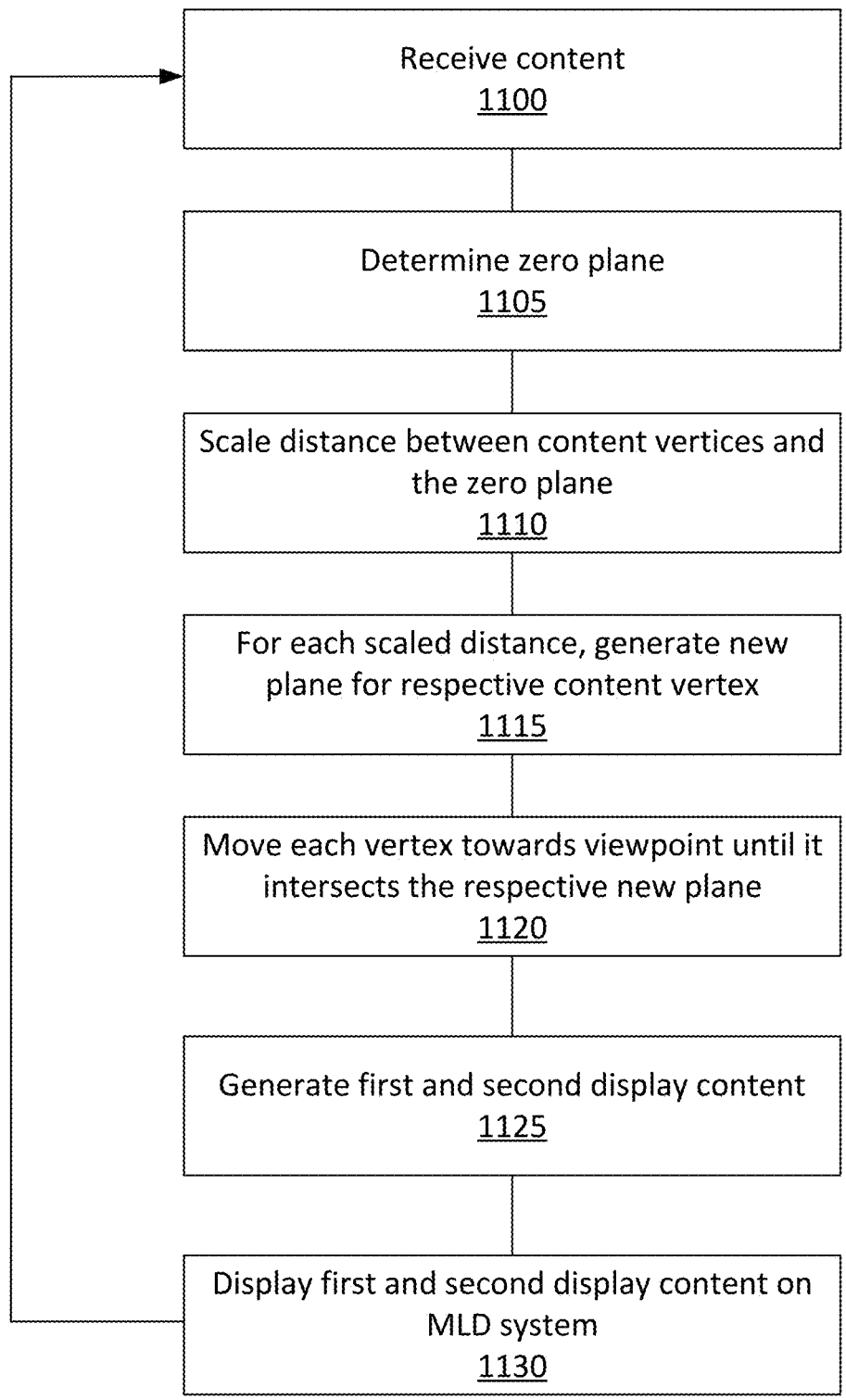
FIG. 11 illustrates a method for applying perspective distortion to content for display on an MLD system according to an embodiment of the present disclosure.

FIG. 11 illustrates a method for applying perspective distortion to content for display on an MLD system according to an embodiment of the present disclosure. Applying perspective distortion to content is not limited to the MLD systems disclosed in this application and can be applied to other display systems providing 'real' depth, such as stereoscopic or auto-stereoscopic displays. The method may be performed by software and/or hardware. For example, a GPU may include hardware programmed to perform the perspective distortion. The method may be performed by processing systems such as the system 10 illustrated in FIG. 1 and/or system 800 illustrated in FIG. 13, but is not so limited.

The method for applying perspective distortion includes receiving content for display (Step 1100). The content may be received from local or remote storage via a wired and/or wireless communication system. The content may include three-dimensional data for displaying content with a depth. The three-dimensional data my include information about surfaces of the object constructed from polygons such as triangles. The three dimensional data may identify the vertices of the content formed by the polygons. The three-dimensional data may also include, texture and/or shading information for the content. The three dimensional data may include information for display the content on a single two-dimensional display.

The content may include information about a virtual space and one or more objects in a virtual space. The content may include information about a direction from which the one or more objects in a virtual space are to be views. For example, the content may include an object that is to be displayed on a display system. The content may be received by a processing system including a GPU for generating images.

In step 1105, a zero plane is determined for the content. The zero plane provides a pivot from which the scaling of the content will be performed. In one example, the vertices of the content (e.g., vertices of polygons) can be distorted based on their depth to the zero plane. The zero plane may be placed at the front-most vertex of the content. This placement of the zero plane may ensure that the absolute front of the object is not distorted. The zero plane may be placed at other positions (e.g., point where zero plane intersect a predetermined are of the content) if the portion of the content in front of the zero plane can be distorted. A different zero plane may be determined for each object. In some embodiments, a single zero plane may be determined for a plurality of objects in a virtual space.

In step 1110, the distance between the content vertices and the zero plane are determined and scaled. The distance for each vertex of the content may be determined. Scaling the determined distance include multiplying the distance by a value between 0 and 1. The scaling factor determined the desire thinness of the content. The scaling value may be determined by the content to be displayed and/or the system on which the content will be displayed. In some embodiments, a predetermined scaling factor may be associated with the display system. MLD display systems that have a smaller spacing between the display screens may have a smaller scaling value applied and MLD display systems that have a smaller spacing between the display screens may have a larger scaling value applied. The scaling factor may be adjustable by a user in response to a user input (e.g., a touch input).

For each scaled distance, a new plane for respective content vertex is determined (Step 1115). The new plane may be parallel to the zero plane. The content vertex will be moved to the new plane in the transformation. However, instead of moving the vertex in a perpendicular direction to the new plane, when squashing the object, the vertex is moved directly towards the viewpoint, until it intersects the respective new plane (Step 1120). As shown in FIG. 3G and 3H, an original vertex is moved along the line formed between the viewpoint and the original vertex to a points where it intersects the new plane associated with the vertex. This operation may be performed for each vertex of the content. Moving the vertices in this manner provides the perspective distortion to the content.

In step 1125, the system may generate content for each display based on the perspectively distorted content. For example, the system may generate a first image for display on a first screen of an MLD system and a second image for display on a second screen of the MLD system. In this operation, a portion of the content and the moved vertices associated with that content may be displayed on different screens. For example, the three dimensional object may be split between two screens to provide 'real' depth to the object due the displacement between the two screens. In step 1130, the generated images are displayed on the displays of the MLD system. Generating the images may include applying texture and/or shading to the content.

Figure 12:
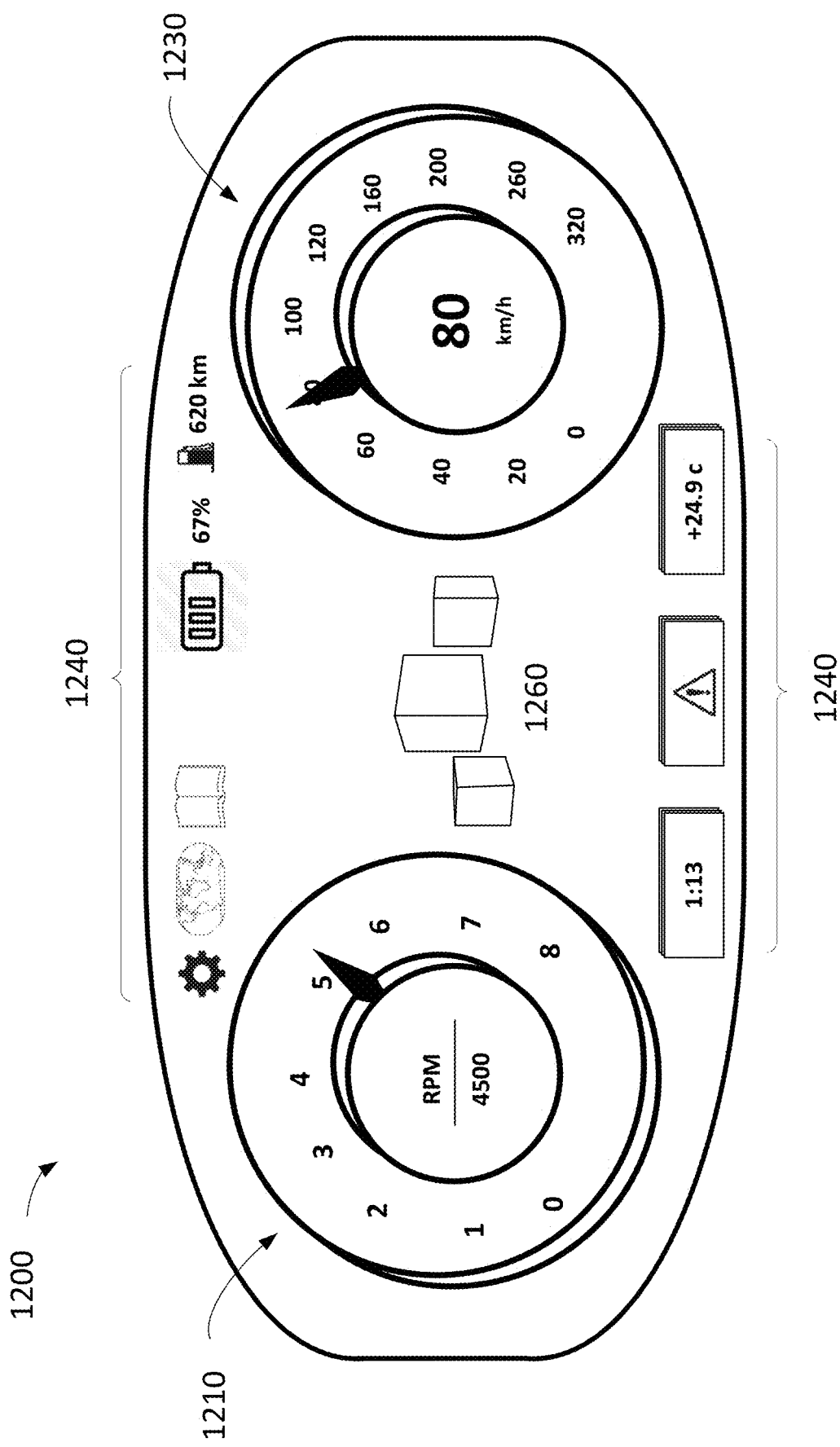
FIG. 12 illustrates a display of an instrument panel including an MLD system according to an embodiment of the present disclosure.

FIG. 12 illustrates a display of an instrument panel 1200 including an MLD system according to an embodiment of the present disclosure. The instrument panel 1200 may display content to which perspective distortion is applied.

The instrument panel 1200 may display content simultaneously on different displays. The content may include a tachometer 1210, a speedometer 1230, objects 1260, and other information 1240. The other information may include vehicle temperature, fuel level, distance left before refueling, contact list, navigation settings, control settings, and warning information.

Content of the instrument panel 1200 may be displayed using a plurality of displays to provide a perception of depth. For example, the tachometer 1210 and/or speedometer 1230 may be displayed using two or three displays of an MLD system.

Perspective distortion may be applied to the content before it is displayed on the instrument panel 1200. The perspective distortion to all of the content or to portions of the content. For example, the perspective distortion may be applied only to the object 1260, because this information is not generated specifically for display on the instrument panel 1200 but received from other sources. Data for objects 1260 may be received from another device (e.g., a phone) or a cloud processing system. The data for the objects 1260 may be configured to be displayed on standard displays (e.g., single 2D display) but may be modified according to the embodiments in this disclosure to display the objects 1260 in a better manner.

Figure 13:
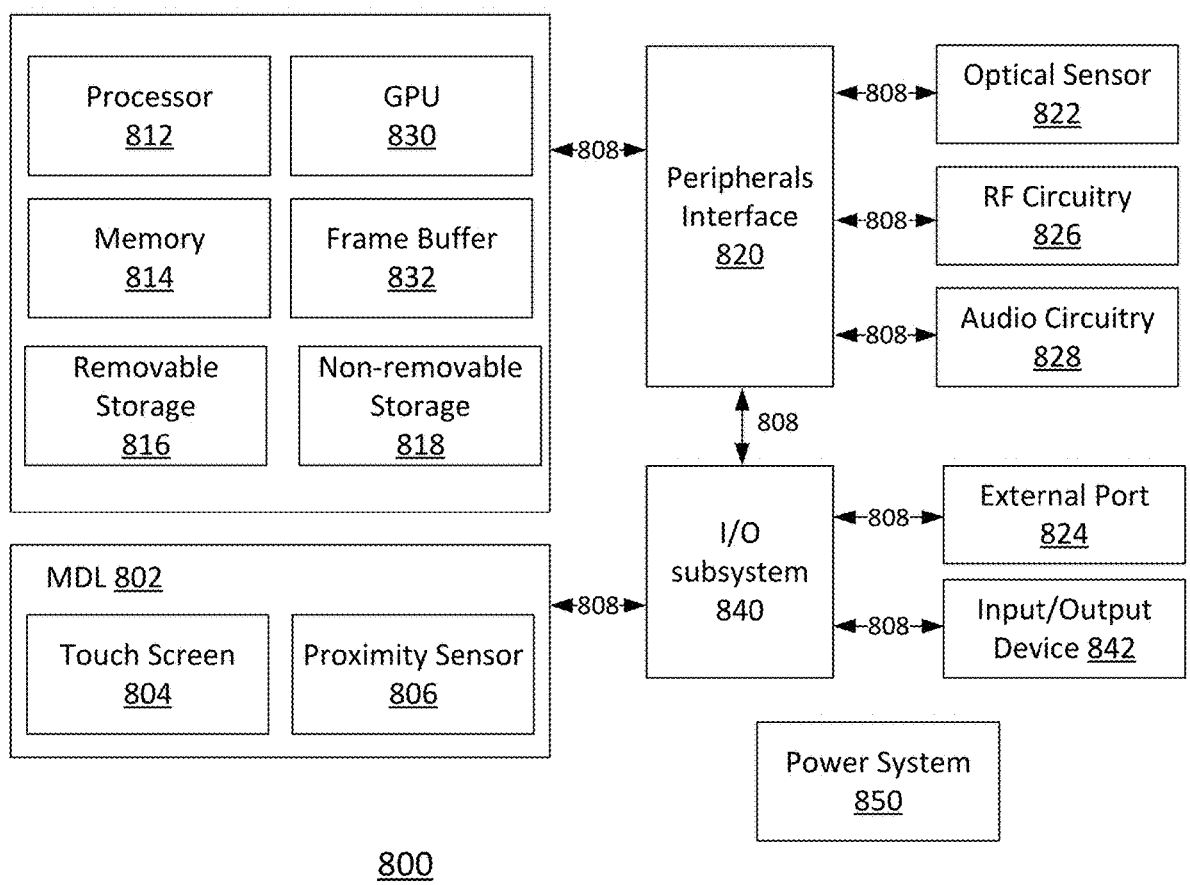
FIG. 13 illustrates an exemplary processing system upon which various embodiments of the present disclosure(s) may be implemented.

FIG. 13 illustrates an exemplary system 800 upon which embodiments of the present disclosure(s) may be implemented. The system 800 may be a portable electronic device that is commonly housed, but is not so limited. The system 800 may include a multi-layer display 802 including a plurality of overlapping displays. The multi-layer system may include a touch screen 804 and/or a proximity detector 806. The various components in the system 800 may be coupled to each other and/or to a processing system by one or more communication buses or signal lines 808.

The multi-layer display 802 may be coupled to a processing system including one or more processors 812 and memory 814. The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 13, the processing system may communicate with other systems, components, or devices via peripherals interface 820. Peripherals interface 820 may communicate with an optical sensor 822, external port 824, RC circuitry 826, audio circuitry 828 and/or other devices (e.g., proximity sensors, range sensors, laser sensors). The optical sensor 882 may be a CMOs or CCD image sensor. The RC circuity 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 712, etc.) of the processing system and/or components of other systems/devices. Additionally, the data may be accessed (e.g., by graphics processor 830) and displayed on an output device coupled to the processing system. Accordingly, memory 814, removable 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include, navigation applications, telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with selected content.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers. The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include a touch screen controller, a proximity controller and/or other input/output controller(s). The touch-screen controller may be coupled to a touch-sensitive screen or touch sensitive display system. The touch screen and touch screen controller may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen. A touch-sensitive display in some embodiments of the display system may be analogous to the multi-touch sensitive screens.

The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

Embodiments of the subject matter and the functional operations described herein can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory storage medium for execution by, or to control the operation of, data processing apparatus (i.e., one or more computer programs). The computer storage medium can be one or more of: a machine-readable storage device, a machine-readable storage substrate, a random or serial access memory device, and combinations thereof.

The invention claimed is:

1. An instrument panel comprising;
a multi-layer display including a first screen and a second screen arranged in a substantially parallel manner, the first screen and the second screen including an array of pixels and the second screen overlapping the first screen;
a light configured to provide light to the first screen and the second screen of the multi-layer display; and
a processing system comprising at least one processor and memory, the processing system configured to:
receive three dimensional data representing an object including a plurality of vertices;
for each vertex of the plurality of vertices of the object, scale a distance between the vertex and a front plane provided at a vertex of the object closest to a viewpoint, and for each vertex move the vertex to an intersection between (1) a reference plane, that is parallel to the front plane and provided at the scaled distance, and (2) a line between the vertex and the corresponding viewpoint;
generate a first image based on a first set of moved vertices of the object and a second image based on a second set of moved vertices of the object; and
simultaneously display the first image on the first screen and the second image on the second screen.

2. The instrument panel of claim 1, wherein the distance between the vertex and the front plane is scaled by a factor between 0 and 1.

3. The instrument panel of claim 1, wherein the distance between the vertex and the front plane is scaled by a factor predetermined for the multi-layer display.

4. The instrument panel of claim 1, wherein the second screen is a touch sensitive display, and the processing system is configured to detect whether a touch input is performed to a portion of the second screen, and adjust a scaling factor for scaling the distance between the vertex and the front plane.

5. The instrument panel of claim 1, wherein the multi-layer display, the light, and the processing system are commonly housed.

6. The instrument panel of claim 1, wherein the processing system is further configured to display text and/or graphics on the first screen and/or the second screen simultaneously with the first and second images in an overlapping manner with at least a portion of the first image and/or the second image.

7. A method for displaying content on a multi-layer display system including at least a first screen and a second screen arranged in a substantially parallel and overlapping manner, the method comprising:
receiving three dimensional data representing an object including a plurality of vertices;
for each vertex of the plurality of vertices of the object, scaling a distance between the vertex and a front plane provided at a vertex of the object closest to a viewpoint, and for each vertex moving the vertex to an intersection between (1) a reference plane, that is parallel to the front plane and provided at the scaled distance, and (2) a line between the vertex and the corresponding viewpoint;
generating a first image based on a first set of moved vertices of the object and a second image based on a second set of moved vertices of the object; and
simultaneously displaying the first image on the first screen and the second image on the second screen.

8. Non-transitory computer-readable medium storing an information processing program for generating images for display on a multi-layer display system including a processor, a first screen, and a second screen arranged in a substantially parallel manner, the first screen and the second screen including an array of pixels and the second screen overlapping the first screen, the information processing program, when executed by the processor causes the multi-layer display system to at least:
receive three dimensional data representing an object including a plurality of vertices;
for each vertex of the plurality of vertices of the object, scale a distance between the vertex and a front plane provided at a vertex of the object closest to a viewpoint, and for each vertex move the vertex to an intersection between (1) a reference plane, that is parallel to the front plane and provided at the scaled distance, and (2) a line between the vertex and the corresponding viewpoint;

generate a first image based on a first set of moved vertices of the object and a second image based on a second set of moved vertices of the object; and
simultaneously display the first image on the first screen and the second image on the second screen.

* * * * *